(12) United States Patent
Griffin et al.

(10) Patent No.: US 8,537,117 B2
(45) Date of Patent: Sep. 17, 2013

(54) HANDHELD WIRELESS COMMUNICATION DEVICE THAT SELECTIVELY GENERATES A MENU IN RESPONSE TO RECEIVED COMMANDS

(75) Inventors: Jason T. Griffin, Kitchener (CA); Cortez Corley, Waterloo (CA)

(73) Assignee: BlackBerry Limited, Waterloo (CA)

( * ) Notice: Subject to any disclaimer, the term of this patent is extended or adjusted under 35 U.S.C. 154(b) by 942 days.

(21) Appl. No.: 11/674,640

(22) Filed: Feb. 13, 2007

(65) Prior Publication Data

US 2007/0211034 A1    Sep. 13, 2007

Related U.S. Application Data

(63) Continuation-in-part of application No. 11/618,500, filed on Dec. 29, 2006, now Pat. No. 7,669,144, which is a continuation-in-part of application No. 11/423,837, filed on Jun. 13, 2006, now abandoned, and a continuation-in-part of application No. 11/423,740, filed on Jun. 13, 2006.

(60) Provisional application No. 60/773,145, filed on Feb. 13, 2006, provisional application No. 60/773,798, filed on Feb. 14, 2006, provisional application No. 60/733,799, filed on Feb. 14, 2006, provisional application No. 60/773,800, filed on Feb. 14, 2006.

(51) Int. Cl.
    *G09G 5/00* (2006.01)

(52) U.S. Cl.
    USPC ........... 345/169; 345/168; 345/157; 345/160; 345/167; 345/156; 715/856; 340/407.1

(58) Field of Classification Search
    USPC ................. 345/169, 167, 168, 157, 163, 156; 345/160; 341/15, 22; 400/472, 489; 715/856; 340/407.1
    See application file for complete search history.

(56) References Cited

U.S. PATENT DOCUMENTS

3,633,724 A    1/1972   Samuel
3,967,273 A    6/1976   Knowlton
(Continued)

FOREIGN PATENT DOCUMENTS

CN    1292517       4/2001
CN    101017407     8/2007
(Continued)

OTHER PUBLICATIONS

European Search Report for EP06253036.5, Issued on Sep. 20, 2006.
(Continued)

*Primary Examiner* — Lun-Yi Lao
*Assistant Examiner* — Olga Merkoulova
(74) *Attorney, Agent, or Firm* — Novak Druce Connolly Bove + Quigg LLP

(57) ABSTRACT

A handheld wireless communication device configured to send and receive text messages. The device is hand cradleable with a body configured to be held in one hand by an operator during text entry. A display is located on a front face of the body and upon which information is displayed to the operator during text entry. A key field is also located on the front face of the body and that includes a plurality of alphanumeric input keys and menu control keys. A microprocessor is provided that receives operator commands from the keys and the trackball navigation tool and which affects corresponding changes to the display based on user input. The key field is arranged such that the keys in lateral exterior key columns are associated with an application function.

27 Claims, 18 Drawing Sheets

(56) References Cited

U.S. PATENT DOCUMENTS

| | | | |
|---|---|---|---|
| 4,029,915 A | 6/1977 | Ojima | |
| 4,180,336 A | 12/1979 | Lonsdale | |
| 4,449,839 A | 5/1984 | Bleuer | |
| D278,341 S | 4/1985 | Scheid | |
| 4,680,577 A | 7/1987 | Straayer | |
| D293,241 S | 12/1987 | Wan | |
| D312,628 S | 12/1990 | Yokoi | |
| D313,401 S | 1/1991 | Tanabe | |
| D313,413 S | 1/1991 | Langton | |
| 5,059,048 A | 10/1991 | Sirkin | |
| 5,184,830 A | 2/1993 | Okada et al. | |
| 5,217,295 A | 6/1993 | Torola et al. | |
| 5,288,158 A | 2/1994 | Matias | |
| 5,319,582 A | 6/1994 | Ma | |
| 5,327,161 A | 7/1994 | Logan et al. | |
| 5,336,001 A | 8/1994 | Lichtenberg | |
| 5,337,346 A | 8/1994 | Uchikura | |
| 5,360,280 A | 11/1994 | Camacho et al. | |
| 5,367,298 A | 11/1994 | Axthelm | |
| D357,253 S | 4/1995 | Wong | |
| 5,410,141 A | 4/1995 | Koenck et al. | |
| 5,410,333 A | 4/1995 | Conway | |
| 5,426,449 A | 6/1995 | Danziger | |
| D359,920 S | 7/1995 | Sakamoto | |
| 5,436,954 A | 7/1995 | Nishiyama et al. | |
| 5,457,454 A | 10/1995 | Sugano | |
| D367,043 S | 2/1996 | Ross et al. | |
| 5,500,643 A | 3/1996 | Grant | |
| 5,521,590 A | 5/1996 | Hanaoka | |
| 5,543,787 A | 8/1996 | Karidis et al. | |
| 5,563,631 A | 10/1996 | Masunaga | |
| 5,575,576 A | 11/1996 | Roysden, Jr. | |
| 5,598,469 A | 1/1997 | Preker | |
| 5,600,790 A | 2/1997 | Barnstijn et al. | |
| 5,606,712 A | 2/1997 | Hidaka | |
| 5,611,031 A | 3/1997 | Hertzfeld et al. | |
| 5,631,673 A | 5/1997 | Yamamoto | |
| D381,021 S | 7/1997 | Williams et al. | |
| 5,659,307 A | 8/1997 | Karidis et al. | |
| 5,661,505 A * | 8/1997 | Livits | 345/169 |
| 5,661,605 A | 8/1997 | Conway | |
| D383,756 S | 9/1997 | Henderson et al. | |
| 5,664,896 A | 9/1997 | Blumberg | |
| 5,672,108 A | 9/1997 | Lam et al. | |
| 5,679,943 A | 10/1997 | Schultz et al. | |
| D386,497 S | 11/1997 | Husling | |
| 5,689,253 A | 11/1997 | Hargreaves et al. | |
| 5,700,097 A | 12/1997 | Kuhlenschmidt | |
| D390,509 S | 2/1998 | Antzinas et al. | |
| 5,729,221 A | 3/1998 | Kroiopp | |
| 5,737,394 A | 4/1998 | Anderson et al. | |
| 5,764,474 A | 6/1998 | Youens | |
| 5,774,540 A | 6/1998 | Davidson | |
| 5,786,776 A | 7/1998 | Kisaichi et al. | |
| D397,369 S | 8/1998 | Rissman | |
| D397,728 S | 9/1998 | Yuen et al. | |
| D399,537 S | 10/1998 | Chi | |
| 5,818,437 A | 10/1998 | Grover et al. | |
| 5,825,353 A | 10/1998 | Will | |
| 5,827,082 A | 10/1998 | Laine | |
| 5,841,374 A | 11/1998 | Abraham | |
| D402,572 S | 12/1998 | Han | |
| D403,362 S | 12/1998 | Fai | |
| 5,861,821 A | 1/1999 | Kato et al. | |
| 5,889,507 A | 3/1999 | Engle | |
| 5,893,798 A | 4/1999 | Stambolic et al. | |
| 5,903,259 A | 5/1999 | Brusky | |
| 5,903,289 A | 5/1999 | Takayanagi | |
| 5,914,702 A | 6/1999 | Derocher | |
| 5,915,228 A | 6/1999 | Kunihiro et al. | |
| 5,920,308 A | 7/1999 | Kim | |
| 5,931,873 A | 8/1999 | Cisar | |
| 5,951,399 A | 9/1999 | Burrell et al. | |
| 5,953,541 A | 9/1999 | King et al. | |
| 5,963,197 A | 10/1999 | Bacon et al. | |
| 5,974,238 A | 10/1999 | Chase | |
| D416,256 S | 11/1999 | Griffin et al. | |
| 5,982,520 A | 11/1999 | Weiser et al. | |
| 5,995,026 A | 11/1999 | Sellers | |
| 6,005,496 A | 12/1999 | Hargreaves et al. | |
| 6,006,351 A | 12/1999 | Peretz et al. | |
| 6,009,333 A | 12/1999 | Chaco | |
| 6,011,554 A | 1/2000 | King et al. | |
| 6,014,429 A | 1/2000 | LaPorta et al. | |
| 6,014,573 A | 1/2000 | Lehtonen et al. | |
| D420,351 S | 2/2000 | Waldner | |
| 6,023,779 A | 2/2000 | Fullam et al. | |
| 6,047,047 A | 4/2000 | Aldridge et al. | |
| 6,047,196 A | 4/2000 | Makela et al. | |
| 6,047,198 A * | 4/2000 | Sudo | 455/566 |
| 6,049,796 A | 4/2000 | Siitonen et al. | |
| 6,052,070 A | 4/2000 | Kivela et al. | |
| 6,061,576 A | 5/2000 | Terrasson | |
| 6,084,576 A | 7/2000 | Leu et al. | |
| 6,091,596 A | 7/2000 | Godfrey et al. | |
| 6,091,956 A | 7/2000 | Hollenberg | |
| 6,094,197 A | 7/2000 | Buxton et al. | |
| 6,097,371 A | 8/2000 | Siddiqui | |
| 6,102,594 A | 8/2000 | Strøm | |
| 6,103,979 A | 8/2000 | Motoyama et al. | |
| 6,107,997 A | 8/2000 | Ure | |
| 6,121,968 A | 9/2000 | Arcuri | |
| D432,511 S | 10/2000 | Eckholm | |
| D433,017 S | 10/2000 | Martinez | |
| D433,460 S | 11/2000 | Griffin et al. | |
| 6,148,261 A | 11/2000 | Obradovich et al. | |
| 6,150,962 A | 11/2000 | Rossmann | |
| 6,157,323 A | 12/2000 | Tso et al. | |
| D436,591 S | 1/2001 | Abston et al. | |
| 6,171,003 B1 | 1/2001 | Lo | |
| 6,212,412 B1 | 4/2001 | Rogers et al. | |
| D441,733 S | 5/2001 | Do et al. | |
| 6,243,789 B1 | 6/2001 | Hasbun et al. | |
| 6,259,044 B1 | 7/2001 | Paratore | |
| 6,278,442 B1 | 8/2001 | Griffin et al. | |
| 6,286,064 B1 | 9/2001 | King et al. | |
| 6,295,052 B1 | 9/2001 | Kato et al. | |
| 6,297,795 B1 | 10/2001 | Kato et al. | |
| 6,304,261 B1 | 10/2001 | Shields et al. | |
| 6,304,431 B1 | 10/2001 | Kim | |
| 6,307,548 B1 | 10/2001 | Flinchem et al. | |
| 6,307,549 B1 | 10/2001 | King et al. | |
| 6,310,609 B1 | 10/2001 | Morgenthaler | |
| D451,079 S | 11/2001 | Ali | |
| 6,333,734 B1 | 12/2001 | Rein | |
| D454,349 S | 3/2002 | Makidera et al. | |
| D454,849 S | 3/2002 | Eckholm | |
| 6,356,258 B1 | 3/2002 | Kato et al. | |
| 6,374,277 B2 | 4/2002 | Vong et al. | |
| D456,794 S | 5/2002 | Laverick et al. | |
| 6,385,463 B1 | 5/2002 | Lieberman et al. | |
| 6,396,482 B1 | 5/2002 | Griffin et al. | |
| D458,239 S | 6/2002 | Shim et al. | |
| D459,327 S | 6/2002 | Ali | |
| D460,068 S | 7/2002 | Lanzaro et al. | |
| D460,493 S | 7/2002 | Griffin et al. | |
| D461,803 S | 8/2002 | Griffin et al. | |
| 6,452,588 B2 | 9/2002 | Griffin et al. | |
| D464,995 S | 10/2002 | Griffin et al. | |
| 6,459,968 B1 | 10/2002 | Kochie | |
| 6,480,185 B1 | 11/2002 | Kilijander | |
| 6,487,396 B1 | 11/2002 | Sassi | |
| 6,489,950 B1 | 12/2002 | Griffin et al. | |
| 6,507,336 B1 | 1/2003 | Lunsford | |
| D469,749 S | 2/2003 | Kim | |
| 6,525,714 B1 | 2/2003 | Varga et al. | |
| D472,225 S | 3/2003 | Griffin | |
| 6,535,749 B1 | 3/2003 | Iwata et al. | |
| 6,538,651 B1 | 3/2003 | Hayman et al. | |
| D472,551 S | 4/2003 | Griffin | |
| D473,226 S | 4/2003 | Griffin | |
| D476,985 S | 7/2003 | Griffin | |
| D478,585 S | 8/2003 | Griffin | |
| 6,611,254 B1 | 8/2003 | Griffin et al. | |

| | | |
|---|---|---|
| D479,233 S | 9/2003 | Griffin |
| D480,722 S | 10/2003 | Griffin |
| 6,630,924 B1 | 10/2003 | Peck |
| 6,647,367 B2 | 11/2003 | McArthur |
| 6,810,271 B1 | 10/2004 | Wood |
| 6,957,397 B1 | 10/2005 | Hawkins |
| 6,959,208 B2 | 10/2005 | Tanaka |
| 6,993,362 B1 | 1/2006 | Aber |
| 7,035,720 B2 | 4/2006 | Taxis |
| 7,067,757 B1 | 6/2006 | Chadha |
| 7,083,342 B2 | 8/2006 | Griffin |
| 7,102,626 B2 | 9/2006 | Denny |
| 7,133,706 B2 | 11/2006 | Kespohl |
| 7,177,604 B2 | 2/2007 | Wong |
| 7,206,599 B2 | 4/2007 | Lemley |
| 7,231,229 B1 | 6/2007 | Hawkins |
| 7,274,354 B2 | 9/2007 | Yamamoto |
| 7,394,456 B2 | 7/2008 | Kim |
| 7,417,565 B2 | 8/2008 | Griffin |
| 7,454,713 B2 | 11/2008 | Spalink |
| 7,461,105 B2 | 12/2008 | Wiggeshoff |
| 7,511,700 B2 | 3/2009 | Skillman |
| 7,525,534 B2 | 4/2009 | Skillman |
| 7,532,198 B2 | 5/2009 | Lazaridis |
| 2001/0044828 A1 | 11/2001 | Kikinis |
| 2001/0048378 A1 | 12/2001 | Horie |
| 2002/0135565 A1 | 9/2002 | Gordon |
| 2002/0142738 A1 | 10/2002 | Jambie |
| 2002/0149566 A1 | 10/2002 | Sarkissian |
| 2002/0167548 A1 | 11/2002 | Murray |
| 2003/0006968 A1* | 1/2003 | Solomon ............... 345/168 |
| 2003/0020692 A1 | 1/2003 | Griffin |
| 2003/0032455 A1 | 2/2003 | Watanabe |
| 2003/0064757 A1 | 4/2003 | Yamadera et al. |
| 2003/0073456 A1 | 4/2003 | Griffin |
| 2003/0094354 A1 | 5/2003 | Badameh |
| 2003/0107555 A1 | 6/2003 | Williams |
| 2003/0115288 A1* | 6/2003 | Ljubicich et al. ........... 709/219 |
| 2003/0193478 A1 | 10/2003 | Ng |
| 2004/0001105 A1 | 1/2004 | Chew et al. |
| 2004/0015500 A1 | 1/2004 | Pugliese |
| 2004/0017354 A1 | 1/2004 | Muranami |
| 2004/0125083 A1 | 7/2004 | Lengeling et al. |
| 2004/0142720 A1 | 7/2004 | Smethers |
| 2004/0142738 A1 | 7/2004 | Anderson |
| 2004/0165924 A1* | 8/2004 | Griffin ............... 400/486 |
| 2004/0198249 A1* | 10/2004 | Grifffin ............... 455/90.3 |
| 2004/0212586 A1 | 10/2004 | Denny et al. |
| 2004/0229663 A1 | 11/2004 | Tosey |
| 2004/0233173 A1* | 11/2004 | Bryant ............... 345/169 |
| 2004/0261031 A1 | 12/2004 | Tuomainen et al. |
| 2005/0053225 A1 | 3/2005 | Griffin |
| 2005/0076309 A1 | 4/2005 | Goldsmith |
| 2005/0119031 A1* | 6/2005 | Spalink et al. ............ 455/566 |
| 2005/0125570 A1 | 6/2005 | Olodort et al. |
| 2005/0140653 A1 | 6/2005 | Pletikosa |
| 2005/0190083 A1 | 9/2005 | Tyneski |
| 2005/0206620 A1 | 9/2005 | Oakley |
| 2005/0244208 A1 | 11/2005 | Suess |
| 2005/0287953 A1 | 12/2005 | Ikeda |
| 2006/0007129 A1 | 1/2006 | Pletikosa |
| 2006/0022947 A1 | 2/2006 | Griffin |
| 2006/0026535 A1 | 2/2006 | Hotelling |
| 2006/0026536 A1 | 2/2006 | Hotelling |
| 2006/0041848 A1 | 2/2006 | Lira |
| 2006/0052145 A1 | 3/2006 | Go |
| 2006/0055789 A1 | 3/2006 | Jin |
| 2006/0097995 A1 | 5/2006 | Nagayasu |
| 2006/0146026 A1 | 7/2006 | Shim |
| 2006/0164399 A1 | 7/2006 | Cheston |
| 2006/0184896 A1 | 8/2006 | Foucher |
| 2006/0218506 A1 | 9/2006 | Srenger |
| 2006/0253801 A1* | 11/2006 | Okaro et al. ............ 715/810 |
| 2007/0002027 A1 | 1/2007 | Lii et al. |
| 2007/0044037 A1 | 2/2007 | Amari et al. |
| 2007/0174785 A1 | 7/2007 | Perttula |
| 2007/0281675 A1 | 12/2007 | Pletikosa |
| 2007/0296703 A1* | 12/2007 | Bestle ............... 345/169 |
| 2008/0057941 A1 | 3/2008 | Scott |
| 2008/0057985 A1 | 3/2008 | Tao |

FOREIGN PATENT DOCUMENTS

| | | |
|---|---|---|
| DE | 19743283 | 2/1999 |
| EP | 0129996 | 1/1985 |
| EP | 0267801 | 5/1988 |
| EP | 0278169 | 8/1988 |
| EP | 0538020 | 4/1993 |
| EP | 0540147 | 5/1993 |
| EP | 0685801 | 12/1995 |
| EP | 0732646 | 9/1996 |
| EP | 0760291 | 3/1997 |
| EP | 0882259 | 12/1998 |
| EP | 0886414 | 12/1998 |
| EP | 1143327 | 10/2001 |
| EP | 1521168 | 4/2005 |
| JP | 59-178531 A2 | 3/1983 |
| JP | 359178531 A | 10/1984 |
| JP | 08211967 | 8/1996 |
| JP | 09261758 | 10/1997 |
| JP | 10254894 | 9/1998 |
| JP | 2000-35857 | 2/2000 |
| JP | 2002222037 | 8/2002 |
| JP | 2002-251253 | 9/2002 |
| JP | 2002297292 | 10/2002 |
| JP | 2003258977 | 9/2003 |
| WO | 9833111 | 7/1998 |
| WO | 9844631 | 10/1998 |
| WO | 9937025 | 7/1999 |
| WO | 0030381 | 5/2000 |
| WO | 0038041 | 6/2000 |
| WO | 0074240 | 12/2000 |
| WO | 0150335 | 7/2001 |
| WO | 0185460 | 11/2001 |
| WO | 02088920 | 11/2002 |
| WO | 03041047 | 5/2003 |
| WO | 2004086211 | 10/2004 |

OTHER PUBLICATIONS

European Search Report for EP06253032.4, Issued on Sep. 20, 2006.
European Search Report for EP06253037.3, Issued on Sep. 20, 2006.
European Search Report for EP06253068.8, Issued on Sep. 20, 2006.
Mackenzie, I.S. "Text Entry for Mobile Computing Models and Methods", Theory and Practice . Human Computer Interaction, 2002, vol. 17, pp. 147-198, Copyright 2002.
Examination report from EP 06253064.7, issued Mar. 25, 2008.
Dell(TM) Axim(TM) X50 Owner's Manual (DELL) Sep. 2004, retrieved on Mar. 11, 2008, from http://support.dell.com/support/edocs/systems/aximx50/en/om/N6966bk1.pdf*.
Dell stellt neue PDA-Topklasse vor (HEISE) Dec. 12, 2004, retrieved on Mar. 11, 2008 from http://www.heise.de/newsticker/suche/ergebnis?rm+result;q=AXIM%20X50;url=/newsticker/meldung/52069/;words=Axim%20x50%20X50*/ ***.
Toth, Viktor T.; "Programmable Calculators: Hewlett-Packard HP-200LX," copyright 2001, 2002, from web pg at www.rskey.org/hp2001x.htm.
Anonymous: Triangular Toggle Keys for Touch-Tone Phones; IBM Technical Disclosure Bulletin, vol. 31, No. 1, Jun. 1, 1988, pp. 47-49, NY, US.
IBM Technical Disclosure Bulletin; vol. 18, No. 12, May 1976; pp. 4187-4190.
"Phone Key Pads;" from web page www.dialabc.com/motion/keypads.html; printed Jan. 21, 2004.
Commercial Telecommunication Standards, E-series ITU-T Recommendations, from web page http://www.comm.itsa.disa.mil/itu/r_e0.html; printed Jan. 21, 2004.
Hirschberg, David; "Using Numeric Keypad with 4-way keys as New Standard for Text Entry in Compact/Mobile Devices," 3 pgs.; submitted to a demonstration session in CHI 2003 conference.
Knodt, Ruediger W.; "Smart Virtual Keyboard System Suitable for Mouse or Stylus Entry," Xerox Disclosure Journal 18 May/Jun. 1993, No. 3, Stamford, Conn.; pp. 245-246.

Jannotti, John; "Iconic Text Entry Using a Numeric Keypad;" from web page www.pdos.lcs.mit.edu/~jj/jannotti.com/papers/iconic-uist02/; printed on Jan. 22, 2004.

Examination Report mailed Feb. 21, 2008. In corresponding application No. 06253032.4.

* cited by examiner

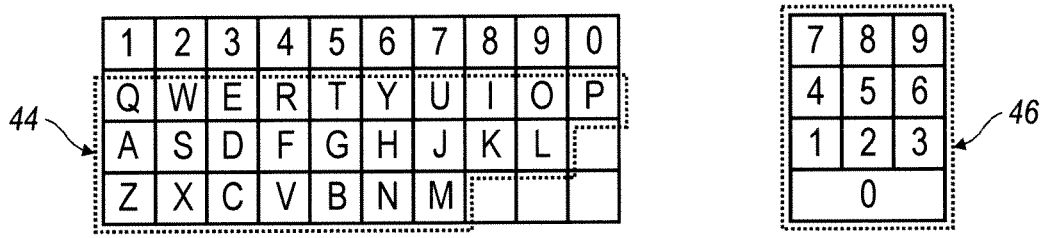
FIG. 10
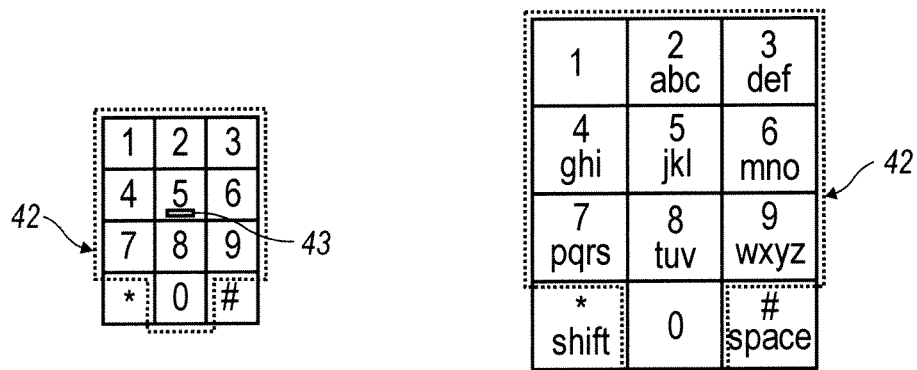
FIG. 11  FIG. 12

HANDHELD WIRELESS COMMUNICATION DEVICE THAT SELECTIVELY GENERATES A MENU IN RESPONSE TO RECEIVED COMMANDS

CROSS REFERENCE TO RELATED APPLICATIONS

The present application is: (i) a non-provisional of U.S. Provisional Application No. 60/773,798, filed Feb. 14, 2006; (ii) a continuation-in-part application of U.S. application Ser. No. 11/618,500, filed on Dec. 29, 2006 now U.S. Pat. No. 7,669,144 which is a continuation-in-part application of U.S. application Ser. No. 11/423,837, filed Jun. 13, 2006 now abandoned and claims the benefit of U.S. Provisional Application Nos. 60/773,145 60/773,798, 60/773,799, and 60/773, 800, filed Feb. 13, 2006, Feb. 14, 2006, Feb. 14, 2006, and Feb. 14, 2006, respectively; and (iii) a continuation-in-part application of U.S. application Ser. No. 11/423,740, filed Jun. 13, 2006. Each of said applications is hereby expressly incorporated herein by reference in their entireties.

FIELD

The present disclosure, in a broad sense, is directed toward handheld electronic devices. More specifically, the disclosure is directed toward handheld communication devices that have wireless communication capabilities and the networks within which the wireless communication devices operate. The present disclosure further relates to the user interfaces of these devices, as well as the software that controls and runs applications on the device.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

A primary focus of the present disclosure is enhanced usability of today's more sophisticated wireless handheld communication devices 300 taking into account the necessary busyness of the front face real estate of these more compact devices that incorporate additional user interfaces.

Many keyboards on mobile devices have an input device for navigation through the graphical user interface. These interfaces can be used to affect movement of a cursor or pointer, or to scroll up, down and about a displayed page. These navigation devices often occupy a relatively large amount of space on the incorporating mobile device. Because the navigation device is frequently used and often requires fine control, a lower end size limitation will normally be observed by device designers.

Another precept in handheld keyboard design is maintaining familiarity; by this it is meant that when possible familiar key layouts are maintained and integrated into new designs thereby encouraging ready acceptance by the consumer. In this same vein, it is important to keep new keyboards visually simple; that is visually segregating keys, when possible, based on their functionality or user group membership. One example is the presentation of a traditional telephone keypad when telephony functions are embodied in the handheld device so that the user is immediately comfortable with the product.

Another keyboard spacing problem is that of finger overlap when keys are smaller than the user's finger and are spaced closely together. Because keys near the center of the keyboard are surrounded by other keys, they are particularly more difficult to press without the user's finger overlapping and inadvertently pressing an adjacent key.

Accordingly, as the demand for small-screen devices capable of running increasingly complex applications continues to grow, the need exists for a way to implement user control interface menus that overcome the various disadvantages with conventional dropdown-style hierarchical menus.

BRIEF DESCRIPTION OF THE DRAWINGS

Exemplary methods and arrangements conducted and configured according to the advantageous solutions presented herein are depicted in the accompanying drawings wherein:

FIG. 10 illustrates a QWERTY keyboard layout paired with a traditional ten-key keyboard;

FIG. 11 illustrates ten digits comprising the numerals 0-9 arranged in a traditional, ITU Standard E. 161 numeric telephone keypad layout, including the * and # flanking the zero;

FIG. 12 illustrates a traditional or standard phone key arrangement or layout according to the ITU Standard E. 161 including both numerals and letters;

DETAILED DESCRIPTION

Figure 1:
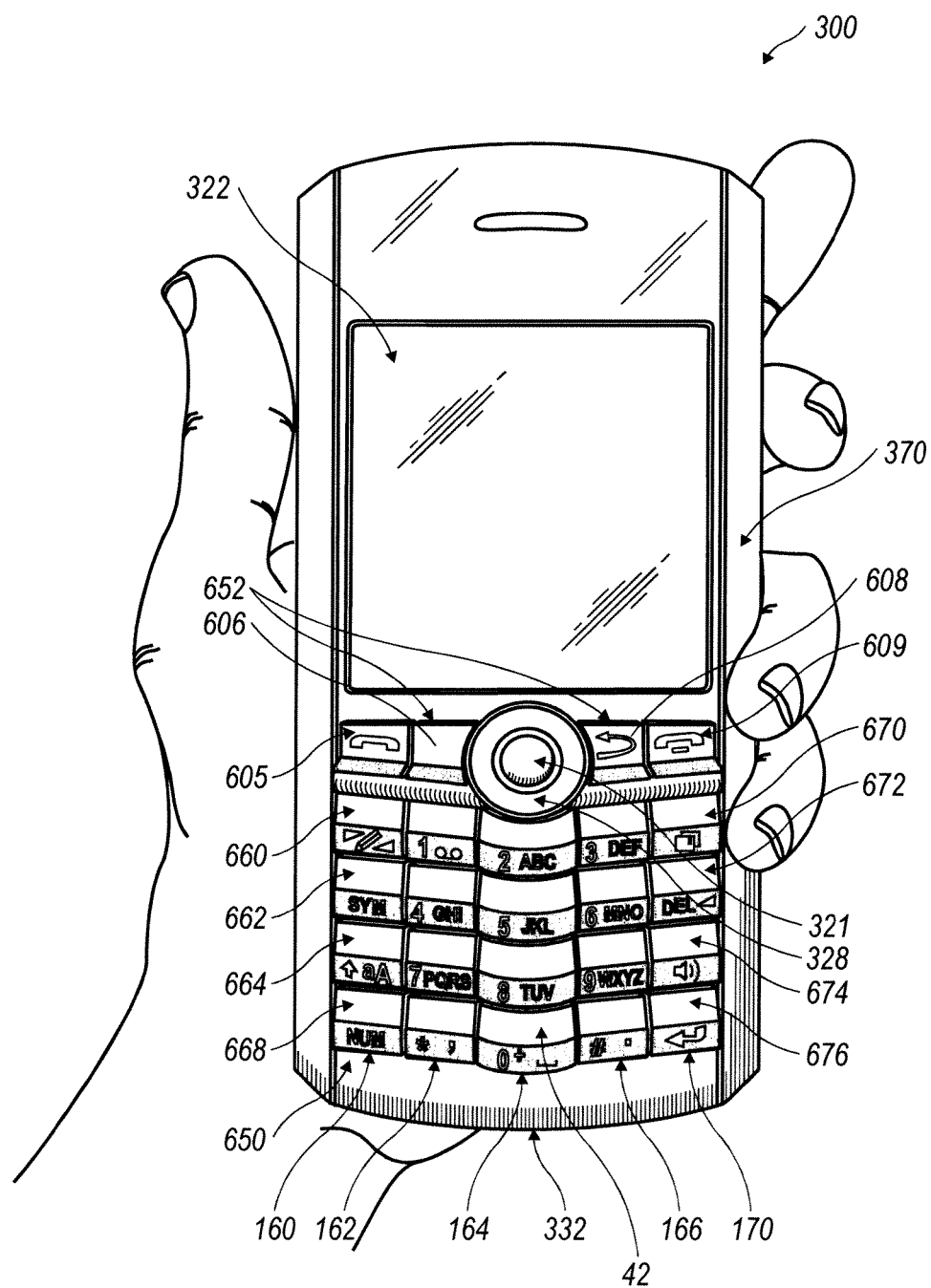
FIG. 1 depicts a handheld communication device configured according to the present teachings cradled in the palm of a user's hand.
Figure 2:
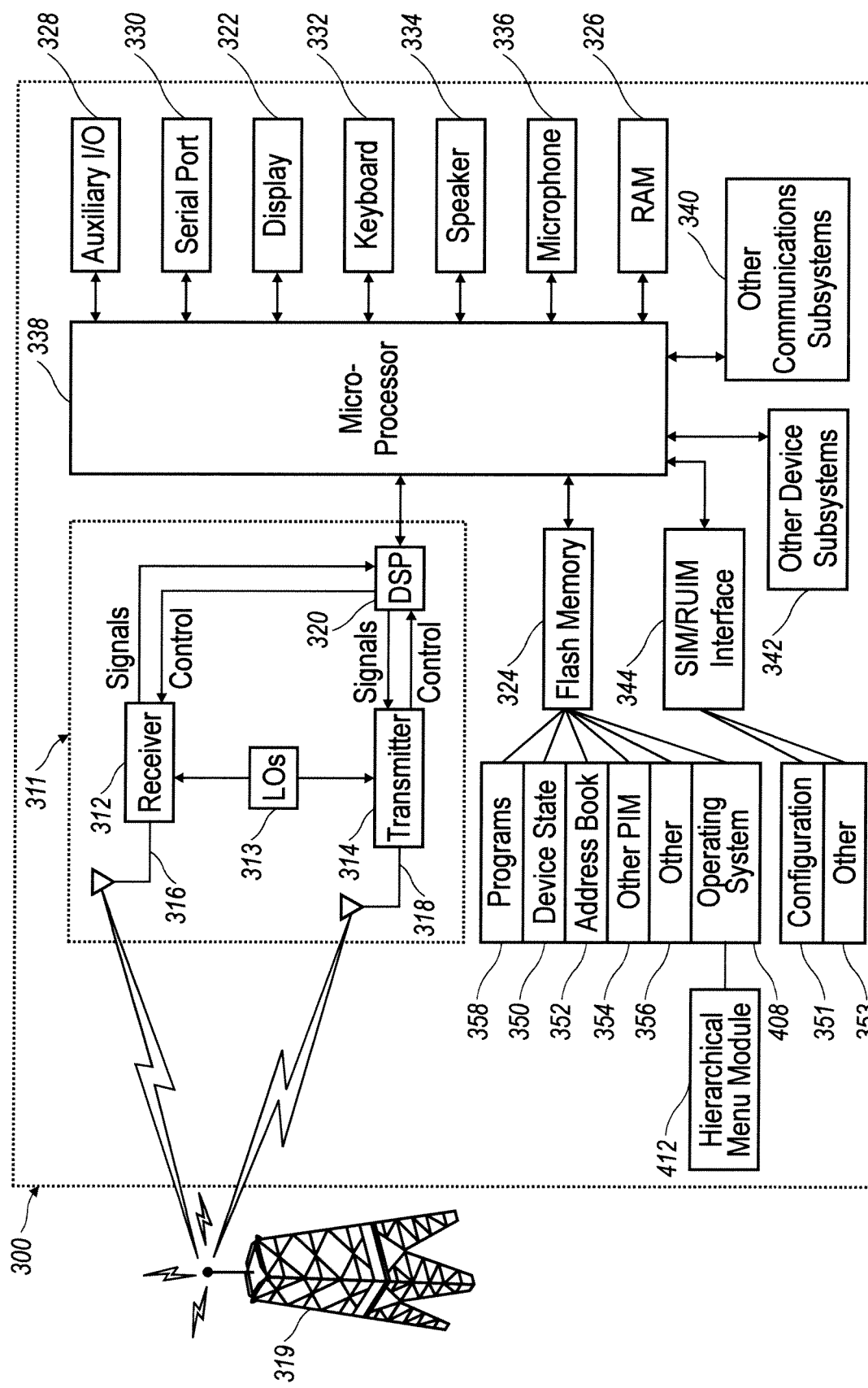
FIG. 2 is a block diagram representing a wireless handheld communication device interacting in a communication network.

An exemplary handheld electronic device 300 such as is shown in FIG. 1 and the device's cooperation in a wireless network 319 is exemplified in the block diagram of FIG. 2. These figures are exemplary only, and those persons skilled in the art will appreciate the additional elements and modifications necessary to make the device 300 work in particular network environments.

The block diagram of FIG. 2 denotes the device's 300 inclusion of a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or an infrared device and associated circuits and components. Additionally, the microprocessor 338 is able to perform operating system 408 functions and preferably enables execution of software applications on the communication device 300.

The included auxiliary I/O subsystem 328 can take the form of a variety of different navigation tools including a trackball 321 based device, a thumbwheel, a navigation pad, or a joystick, just as examples. These navigation tools are preferably located on the front surface of the device 300 but may be located on any exterior surface of the device 300. Other auxiliary I/O devices can include external display devices and externally connected keyboards (not shown). While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

As may be appreciated from FIG. 1, the handheld communication device 300 comprises a lighted display 322 located above a keyboard 332 suitable for accommodating textual input to the handheld communication device 300 when in an operable configuration. The front face of the device has a keyfield 650 that includes menu keys 652, alphanumeric keys 630, alphabetic keys 632, numeric keys 42, and other function keys as shown in FIG. 1. As shown, the device 300 is of unibody construction, also known as a "candy-bar" design.

Keys, typically of a push-button or push-pad nature, perform well as data entry devices but present problems to the user when they must also be used to affect navigational control over a screen-cursor. In order to solve this problem the present handheld electronic device 300 preferably includes an auxiliary input 328 that acts as a cursor navigational tool and which is also exteriorly located upon the front face of the device 300. Its front face location is particularly advantageous because it makes the tool easily thumb-actuable like the keys of the keyboard. A particularly usable embodiment provides the navigational tool in the form of a trackball 321 which is easily utilized to instruct two-dimensional screen cursor movement in substantially any direction, as well as act as an actuator when the ball 321 is depressed like a button. The placement of the trackball 321 is preferably above the keyboard 332 and below the display screen 322; here, it avoids interference during keyboarding and does not block the user's view of the display screen 322 during use.

Figure 13:
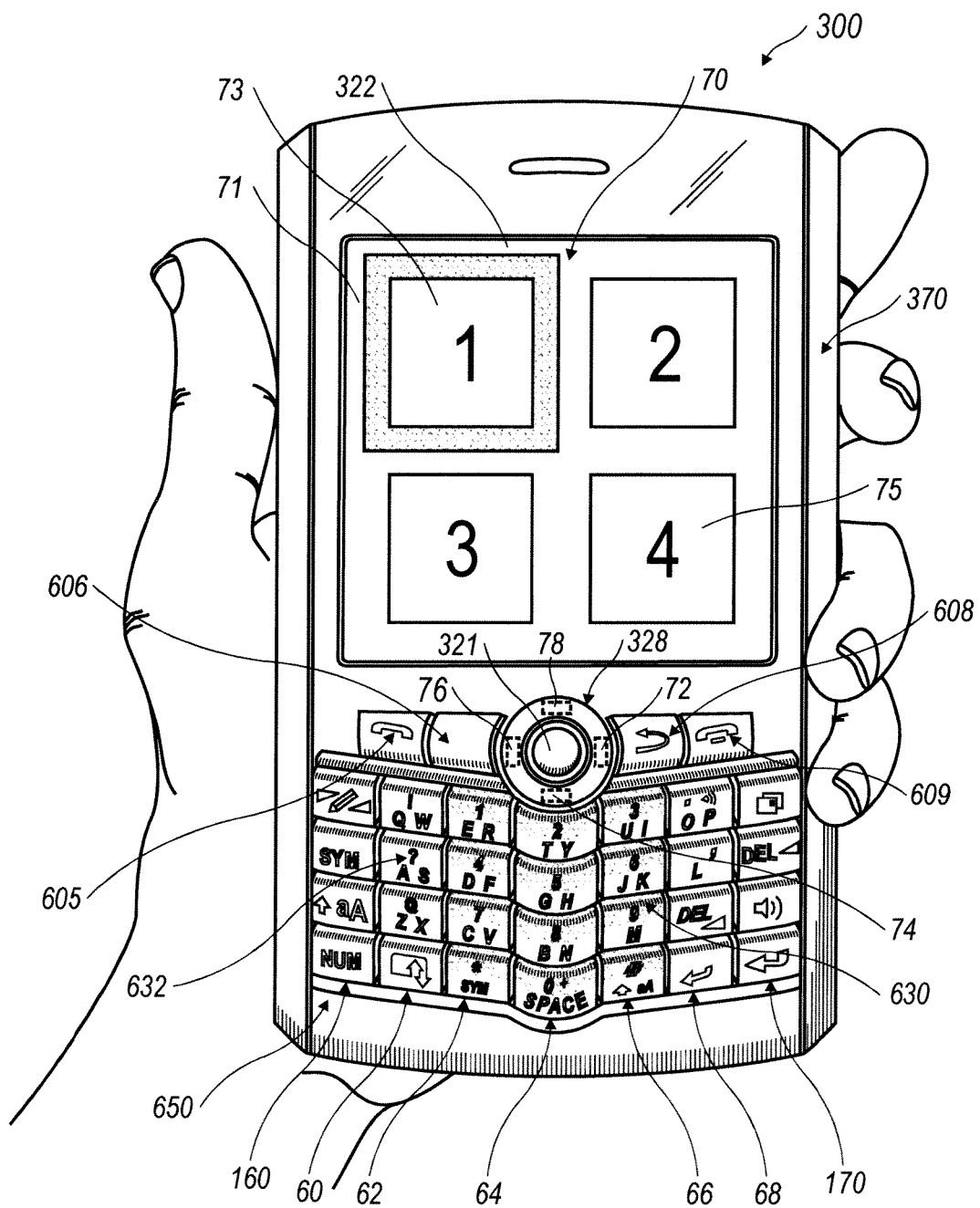
FIG. 13 is a perspective view of another exemplary handheld communication device cradled in a user's hand and displaying an array of four icons (1, 2, 3 and 4) on a display thereof.

As illustrated in at least FIG. 1, the present disclosure is directed to a handheld wireless communication device 300 configured to send and receive text messages. The device includes a hand cradleable body configured to be held in one hand by an operator of the device during text entry. A display 322 is included that is located on a front face 370 of the body and upon which information is displayed to the operator during text entry. A key field 650 is also located on the front face of the body and which comprises a plurality of alphanumeric input keys 630 and at least one menu control key 652. A trackball navigation tool 328 is also located on the front face of the body. The alphanumeric input keys comprise a plurality of alphabetic keys 632 having letters associated therewith. In at least one embodiment, the order of the letters of the alphabetic keys 632 on the presently disclosed device can be described as being of a traditional, but non-ITU Standard E. 161 layout, as shown in FIG. 13. Additionally, the alphanumeric keys have a numeric telephone keypad at least partially overlaid onto the keys with alphabetic characters. A microprocessor 338 is provided internal to the device body that receives operator commands from the alphanumeric input keys 630, the at least one menu control key 652 and the trackball navigation tool 328 and which affects corresponding changes to the display based on user input.

Furthermore, the plurality of keys in the key field 350 are arranged in a plurality of columns and each key in the lateral exterior key columns 160, 170 is associated with an application function. The description given below describes some of the possible key combinations that can be presented in these lateral exterior columns 160, 170. While the description given below describes a five column and four row arrangements, other embodiments with additional rows and/or columns are considered within the scope of this disclosure and can be seen in relation to the other figures presented herein. Additionally, the lateral exterior key columns 160, 170 may be described as flanking columns/function keys or outer columns.

For receiving input from the user, it has become standard to provide a plurality of actuable keys that make up the key field 650 in conjunction with a navigation tool 328 that can be used for such things as menu scrolling in at least one dimension, and preferably two. According to the presently disclosed key arrangement, a phone keypad 42 of a traditional layout is located between a set of flanking function keys. The phone layout 42 is described below in greater detail, but characteristically can be described as arranged such that keys for "1,", "2," and "3" are arranged over other numbers in the telephone key layout. In the example of FIG. 1, the phone keypad 42 is delineated from flanking functions keys using a distinctive background color that immediately distinguishes the phone keypad 42 from the flanking functions keys.

In the example of FIG. 1, the phone keypad is less visually delineated, but more defined by the unique construction of the keys that make up the phone keypad. In the examples of both FIGS. 1 and 16, the phone keypad 42 is centered in the key field 350. However, in the embodiment of FIG. 1 the center column of keys 164 has an inverted arch-shape in comparison to the other keys which have parallel sides. In this manner, the user can touch-find the phone keypad 42 by finding the center column 164 of keys by feeling for the dip of the center column 164 of keys. As a further touch-guide, a home key within the phone keypad is advantageously designated using a surface irregularity such as a bump or recess detected by finger-touch. Further examples of this surface characteristic are given below.

Figure 16:
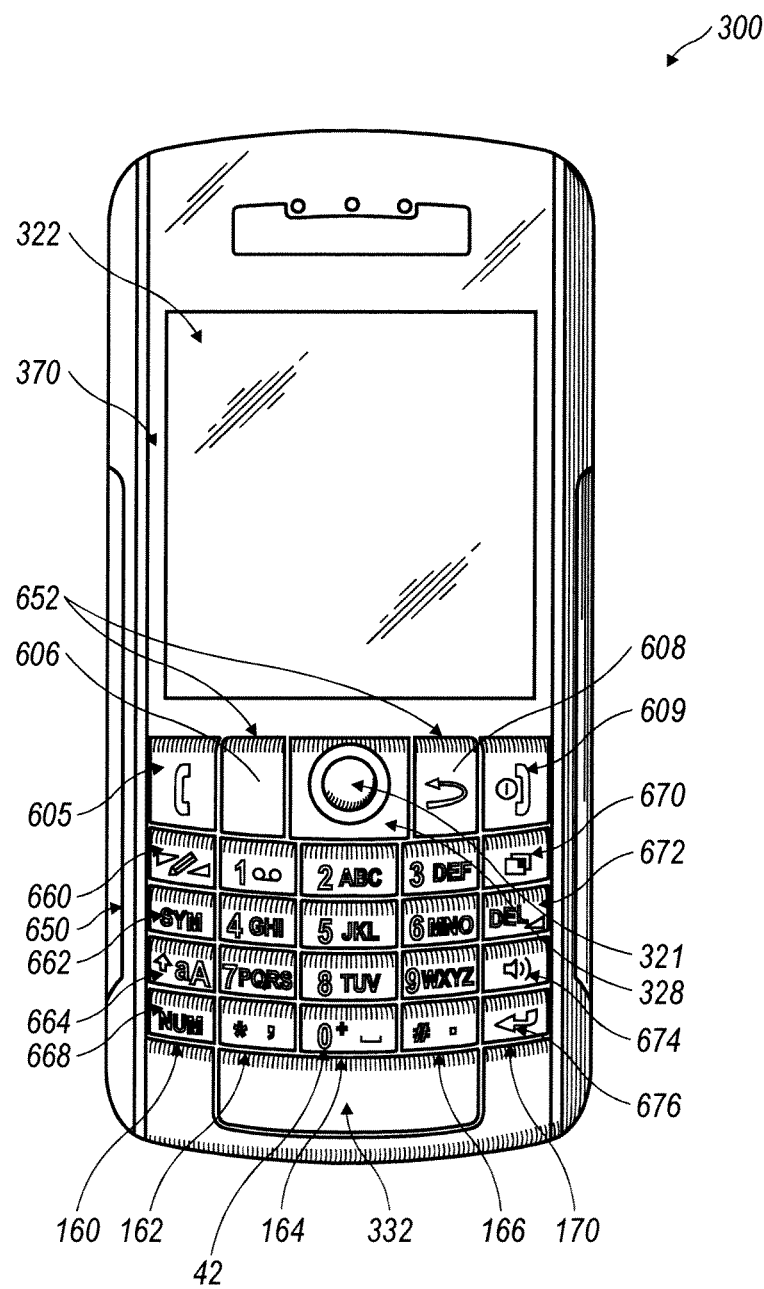
FIG. 16 depicts an alternative handheld communication device configured according to the present teachings cradled in the palm of a user's hand.

As may be appreciated in each of FIGS. 1 and 16, the key field 350 is composed of a four-row-by-five-column array of actuable keys. The phone keypad 42 occupies the center three columns, while various function keys occupy the flanking first 160 and fifth columns 170. Such a layout presents very well when the center three columns (162, 164, 166) are highlighted; for example, using a different background color in comparison to the outside function keys. This fosters user comfort through perceived familiarity with the prominently presented phone keypad 42.

In that the actuable keys are arranged in the four-row-by-five-column array, individual keys will henceforward be referred to by their row and column location in the array. For example, the top left key is $K_{1,1}$, the top right key is $K_{1,5}$ and the bottom right key is $K_{5,5}$. Therefore, the actual keys of the phone keypad 42 occupy the keys indicated in the table below and carry the indicated insignia. When in "telephone mode," or with NUM lock activated, actuation of the key inputs the associated numeral; when "text mode" is enabled, activation of the key inputs a corresponding alpha character or symbol.

As explained, an important feature of the presently disclosed arrangement is the phone keypad 42 being flanked by columns of function keys. It is contemplated that the represented functions may vary; however, the illustrative examples of the accompanying figures present a group of functions, and their arrangement, which has proven to be desirable.

The functionality of the keys presented in the above table is further described below. While these are examples of functions that have been arranged in the two outer columns other arrangements are possible and some additional description of those functions will be provided herein.

The top right most key in the 5 by 4 arrangement is labeled $K_{1,1}$. As can be seen in at least FIGS. 1 and 16, $K_{1,1}$ carries a writing tool symbol between opposing arrows as shown on key 660. This represents a toggle function (the opposing arrows) between a predictive text mode functionality in the phone keys and a tap-typing mode. As described below, the predictive text mode selects a letter to be displayed on the screen when there are multiple letters on a single key. The tap-typing mode or multi-tap mode is where the user taps the key to produce a different letter. For instance in multi-tap mode, a key with letters "ABC" requires the user to tap the key three times to produce the letter "C." In other embodiments, this key 660 could be place in other positions in the left-hand side lateral exterior key column 160.

The next key 662 in the left column is labeled $K_{2,1}$. This key 662 is marked "SYM," as shown in FIGS. 1 and 16, and acts as a call-up which displays a correlation table of symbols mapped to the actuable keys of the key field. This dedicated key for entering symbols into the device allows for a centralized location for selecting and entering symbols. In other embodiments, this key 662 could be place in other positions in the left-hand side lateral exterior key column 160.

The next key 664 in the left column is label $K_{3,1}$. This key 664 is a letter capitalization key signified using an up-arrow followed by a small "a" and then a capital "A". This key 664 may also be referred to as a "CAP lock" key. The function of the key can be set up where it will capitalize the following key entry or that it will enter a mode where all subsequent keys that are input will be capitalized until the capitalization key is depressed again. In other embodiments, this key 664 could be place in other positions in the left-hand side lateral exterior key column 160.

The last key 668 in the left column is $K_{4,1}$. This key 668 carries the insignia "NUM" which is representative of a numbers-lock function when in text typing mode. This key 668 functions similar to the capitalization key except that it will select the number from a key that has a number and at least one other character or function associated with it. Thus, when typing a telephone number the key 668 can be enabled such

| $K_{1,1}$ | $K_{1,2}$ | $K_{1,3}$ | $K_{1,4}$ | $K_{1,5}$ |
|---|---|---|---|---|
|  | 1 | 2 | 3 |  |
| "Text Mode" | "Message Control" | ABC | DEF | "Page Up/Down" |
| $K_{2,1}$ | $K_{2,2}$ | $K_{2,3}$ | $K_{2,4}$ | $K_{2,5}$ |
|  | 4 | 5 | 6 |  |
| "Symbols" | GHI | JKL | MNO | "Delete" |
| $K_{3,1}$ | $K_{3,2}$ | $K_{3,3}$ | $K_{3,4}$ | $K_{3,5}$ |
|  | 7 | 8 | 9 |  |
| "Cap Lock" | PQRS | TUV | WXYZ | "Speakerphone" |
| $K_{4,1}$ | $K_{4,2}$ | $K_{4,3}$ | $K_{4,4}$ | $K_{4,5}$ |
|  |  | 0 |  |  |
| "Num Lock" | "Asterisk" "Comma" | "Plus" "Space" "#" | "Period" | "Return" | that a depression of the key subsequent to the depression of the "NUM" key will select the number associated with that key. Alternatively, the key 668 can be enabled such that it will enable the entry of the numbers until depressed again. In yet another embodiment, an additional key is required to enter into a number lock function where the number from subsequent keys is selected. In still another embodiment, the number lock feature is enabled when the key 668 has been depressed for longer than a pre-determined amount of time. In other embodiments, this key 668 could be place in other positions in the left-hand side lateral exterior key column 160.

The top key 670 in the right hand column is labeled $K_{1,5}$. This key 670 carries a "double-page" insignia representative of a page-down and/or page-up function with respect to the display screen 322. When viewing pages on the display screen, pressing this key 670 enables the user to scroll in a given direction. The key 670 maybe enabled to operate with an additional key to determine the direction of travel or it may be enable to operate in a multi-tap fashion such that the key when first depressed moves the screen in a page down direction and upon a second depression moves the page in a page up direction. In other embodiments, this key 670 could be place in other positions in the right-hand side lateral exterior key column 170.

The second key 672 in the right hand column is labeled $K_{2,5}$. This key 672 is a backward acting deletion key signified by the insignia DEL over a backward arrow. When this delete key 672 is depressed, the previously entered character is removed from the display and/or memory. In other embodiments, this key 672 could be place in other positions in the right-hand side lateral exterior key column 170.

The third key 674 in the right hand column is labeled $K_{3,5}$. This key 674 is a speaker-phone actuation key signified by a speaker symbol. When placing a telephone call, the speaker phone key 674 switches the audible sound to a setting such that it is capable of being heard a distance away from the ear such as on a table top in front of the user. This enables the user to place telephone calls without hold the device next to the user's ear. In other embodiments, this key 674 could be place in other positions in the right-hand side lateral exterior key column 170.

The fourth key 676 in the right hand column is labeled $K_{4,5}$. This key 676 is a return-carriage key using a conventional insignia representative of the function. This key 676 either inputs the entered information or places a carriage return in a text field. In other embodiments, this key 676 could be placed in other positions in the right-hand side lateral exterior key column 170.

As may be appreciated from the above description and the accompanying illustrations of representative configurations, the outboard columns of function keys provide lateral "framing" about the phone keypad. Not only does this provide ready access to the function keys located adjacent the side-edges of the device, but selective colorization or similar treatment as shown in FIG. 1 delineates and highlights the phone keypad 42.

As further demonstrated in FIG. 1, bottom visual "framing" of the phone keypad 42 can be provided using matched colorization of the housing of the device adjacent the lower edge of the phone keypad 42. Upper "framing" of the phone keypad 42 is also presented in FIG. 1 by matched colorization of an associated navigation tool 328, which as illustrated, takes the form of a trackball 321.

As shown in FIG. 1, it has also been found advantageous to have keys that are most commonly used in conjunction with the navigation tool 328 to be located in close proximity thereto. Examples of such keys include menu display keys 606 and backup keys 608 for moving upward, out of a menu hierarchy that has been drilled down into.

As described above, in FIGS. 1 and 3, the trackball is located below the display and above the phone keypad. Immediately adjacent to and level with the trackball are associated function keys. At outer flanks of these adjacent keys is a call-initiation key on the left hand side and a call-disconnect key on the right hand side.

As depicted in FIGS. 1 and 16, the trackball 321, together with the two associated menu function keys 605, 606, 608, 609 are colored or otherwise treated to appear as part of the phone keypad 42. It is also contemplated that the trackball 321 and associated menu function keys 605, 606, 608, 609 can be colored or otherwise treated to present the outboard, laterally framing function keys, thereby completing the framing of the phone keypad by proving a "top frame member" thereto.

According to the invention, a unique functionality is associated with the navigation tool 328 and the two adjacent keys 652 on either side thereof. This unique functionality is in part enabled by the fact that the trackball 321 is not only used for menu-navigation based on rotation of the trackball 321, but also by the fact that depressing the ball acts as a function actuator or menu-item-selector, depending upon the situation.

Using e-mail handling as an example, depression of the trackball 321 can be used to activate and display a main menu of the device. The trackball 321 is then rotated causing scroll-down to the e-mail insignia and depression of the trackball 321 selects the e-mail functions. A second depression of the trackball 321 intuitively selects the message inbox based on program strategy that specifies opening the message inbox as the most probable activity desired by a user upon entering the e-mail function. At this juncture, the message inbox is opened displaying a listing of inbound messages. A third depression of the trackball 321 will open the top message, while rotation of the trackball 321 causes successive designation of the messages down the listing. Once designated, a subsequent depression of the trackball 321 opens that message.

At this point, the next step of the user is not intuitive and an activity menu must be displayed. In the instance of an opened inbound message, depression of the trackball 321 may display the most popular activities such as "reply" and "reply all". Because there are other functions, though less probable, that may be desired by the user, the left-hand function key 606 adjacent to the navigation tool 328 is programmed as a menu-expansion key. Continuing with the same example, with "reply" and "reply all" already displayed as selectable activities, depression of the left function key expands the menu to include "forward" and "delete". Once again, the trackball 321 may be used for making a particular selection among the now four available activities.

Once the user has "drilled down" into a particular function, they often desire to step back out of the function, one level at a time. This is accomplished by depressing the right function key 608 which causes a display of the next higher menu level. Preferably, each step backward displays a full menu of available functions at that menu level. This can serve as an adjunct to the intuitive functionality of the navigation tool. For instance, the experienced user may come to a desired functionality most easily by drilling down through multiple levels by successive trackball depression, and going one level deeper than the desired level, but then actuating the right flanking key which backs up to the desired level and simultaneously displays the full menu of functions available at that level.

It is also contemplated that the left hand menu expansion key 606 can be used at any level where fewer than all function options are displayed.

Figure 7:
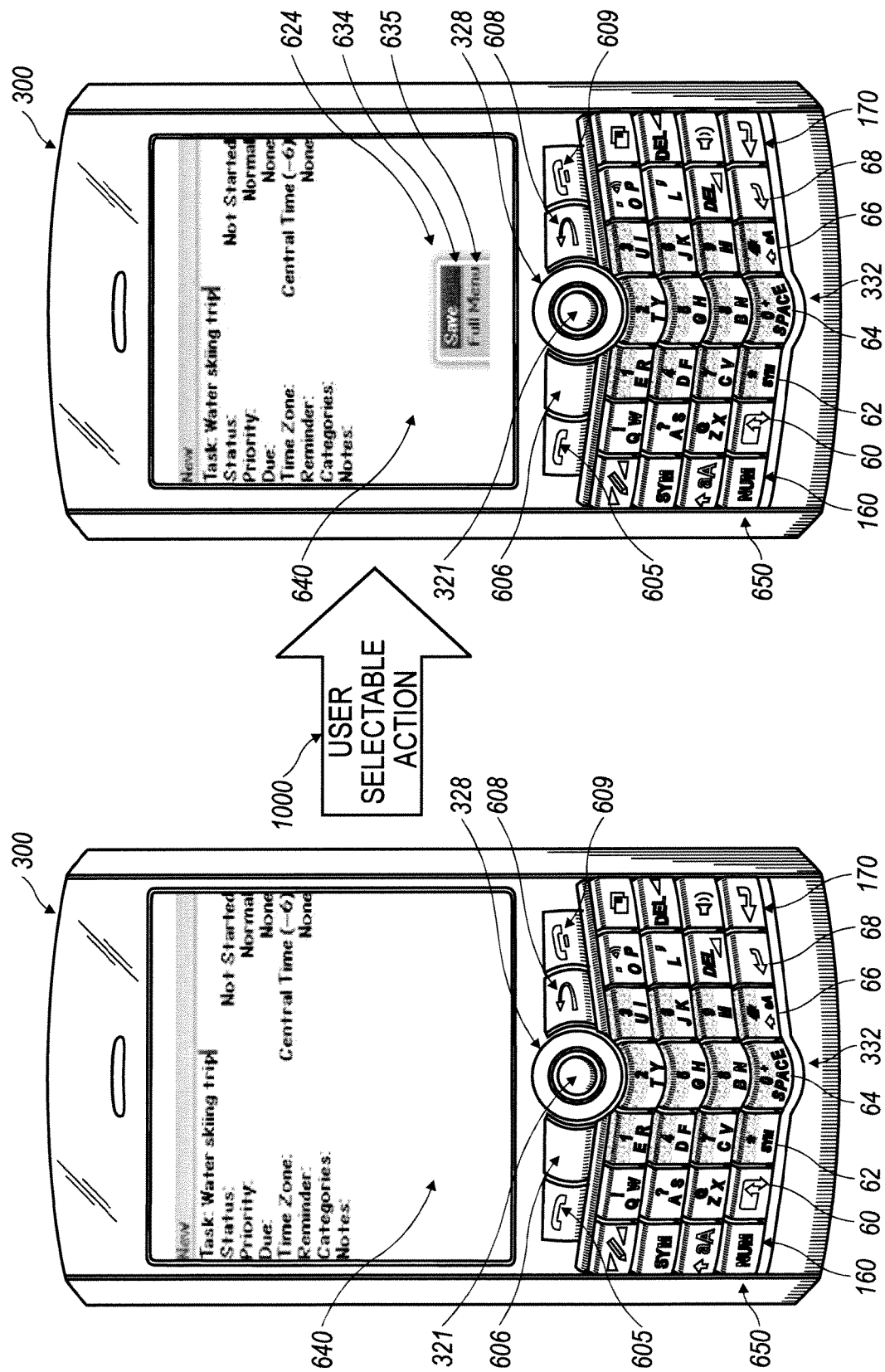
FIG. 7 depicts an expedited menuing system on a handheld electronic device in which a short or abbreviated menu pops-up showing a listing of one menu item the user may desire to perform.

In addition to the phone keypad layout described above, the function keys can be implemented along with a standard keyboard layout including a QWERTY, QWERTZ, AZWERTY, and Dvorak layouts. For example, in a full QWERTY layout, the total number of columns is ten. Then using the functional key framing described above, two additional columns can be provided in the left and right most columns. This enables a unified layout to be implemented. In some embodiments featuring the full QWERTY layout and functional columns, the total number of function keys in the outer columns (160, 170) may be reduced to only three keys per column. In another example, a reduced QWERTY keyboard is provided on the keyboard with two flanking outer columns of function keys, as shown by FIGS. 7 and 13. This reduced QWERTY arrangement in at least one embodiment is arranged in five columns and four rows. The flanking columns make this a seven column arrangement. The total number of keys in the two outer columns can be the same as the number of keys in the interior columns or different from the number of keys in the interior columns.

The trackball navigation tool 321 enables methods and arrangements for facilitating diagonal cursor movement in such environments as icon arrays 70 and spreadsheet grids on a display screen 322 of a relatively small, wireless handheld communication device 300, variously configured as described above, such as that depicted in FIG. 13. One exemplary embodiment takes the form of a method for affecting diagonal movement of a cursor 71 on the display screen 322 of a handheld communication device 300. The method includes sensing movement at an auxiliary user input 328 of the handheld communication device 300 indicative of the user's desire to affect diagonal movement of the cursor 71 on the display screen 322 of the handheld communication device 300. X-direction signals and Y-direction signals are produced based on the sensed movement at the auxiliary user input 328. During that time while the necessary signals are being collected and processed, the cursor 71 is held steady on the display screen 322 until a predetermined criterion is met for discriminating whether the user has indicated x-direction cursor movement, y-direction cursor movement or diagonal cursor movement. In that the processing is typically conducted by a processor 338 according to a resident computer program, the predetermined criterion is either a preset condition or a user definable condition, examples of which are discussed in greater detail hereinbelow. Finally, diagonal cursor movement is affected on the display screen 322 of the handheld communication device 300 when diagonal cursor movement is discriminated to have been user indicated.

Furthermore, the device is equipped with components to enable operation of various programs, as shown in FIG. 2. In an exemplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through predefined application program 358 interfaces. More specifically, the operating system 408 typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While the operating system 408 in a preferred embodiment is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks, generally described as packet-switched, narrowband, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

The user is capable of interacting with the device 300 through reading information displayed on the display screen 322, entering text using the keyboard 332, and inputing cursor movement through the use of the auxiliary user input device 328, among other ways. The auxiliary user input device 328 as described above is preferably a trackball 321, as depicted in FIG. 13. Motion of the trackball 321 is assessed using a plurality of sensors 72, 74, 76, 78 that quantify rotational motion of the trackball 321 about an intersecting x-axis 82 and an intersecting y-axis 84 of the trackball (see FIG. 14).

In one embodiment, the plurality of sensors 72, 78 number two. One of the two sensors 72 outputs signals indicative of x-component rolling motion of the trackball 321 relative to the handheld communication device 300 and about the intersecting y-axis 84 of the trackball 321 (see the rotational arrows about the y-axis in FIG. 14). The other of the two sensors 78 outputs signals indicative of y-component rolling motion of the trackball 321 relative to the handheld communication device 300 and about the intersecting x-axis 82 of the trackball 321 (see the rotational arrows about the x-axis in FIG. 14). In this configuration, the two sensors 72, 78 are oriented radially about the trackball 321 with approximately ninety degree spacing therebetween. In one embodiment, each of the sensors is a hall effect sensor located proximate the trackball.

Figure 14:
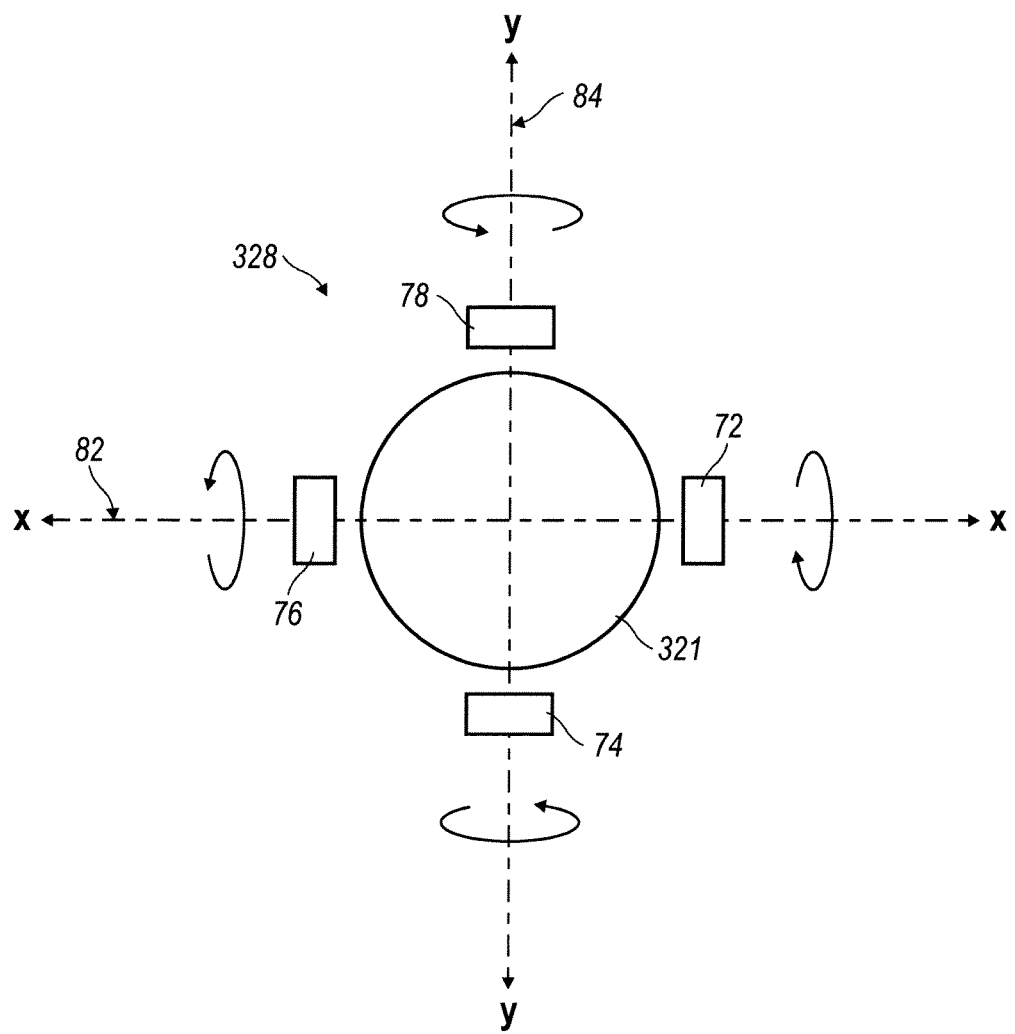
FIG. 14 is a schematic representation of an auxiliary user input in the form of a trackball.

In another embodiment, the plurality of sensors 72, 74, 76, 78 number four. A first pair of opposed sensors 72, 76 outputs signals indicative of x-component rolling motion of the trackball 321 relative to the handheld communication device 300 and about the intersecting y-axis 84. A second pair of opposed sensors 74, 78 outputs signals indicative of a y-component rolling motion of the trackball 321 relative to the handheld communication device 300 and about the intersecting x-axis 82. The four sensors 72, 74, 76, 78 are oriented radially about the trackball 321 with approximately ninety degree spacing between consecutive sensors as depicted in FIGS. 13 and 14.

Each produced x-direction signal represents a discrete amount of x-component (incremental x-direction) rolling motion of the trackball 321 relative to the handheld communication device 300 while each produced y-direction signal represents a discrete amount of y-component (incremental y-direction) rolling motion of the trackball 321 relative to the handheld communication device 300.

In a preferred embodiment, the predetermined criterion for discriminating user indicated x-direction cursor movement is identification of a threshold number of x-direction signals in a predetermined signal sample. For example, out of a moving-window sample of 10 consecutive signals, six or more must be x-signals in order to be indicative of desired x-direction cursor movement. Likewise, the predetermined criterion for discriminating user indicated y-direction cursor movement is identification of a threshold number of y-direction signals in a predetermined signal sample. The same sampling example holds, but applied to y-signals instead of x-signals. In a similar respect, the predetermined criterion for discriminating user indicated diagonal cursor movement is identification of a threshold number of x-direction signals and a threshold number of y-direction signals in a predetermined signal sample. For instance, out of a moving-window sample of 10 consecutive signals, four or more must be x-signals and four or more must be y-signals in order to be indicative of desired diagonal cursor movement.

In a more generic sense, it is pattern recognition software that is utilized to identify user indicated diagonal cursor movement based on analysis of a predetermined signal sample.

Alternatively, a method is disclosed for affecting diagonal movement of a highlighting cursor 71 amongst an array of icons 70 on a display screen 322 of a handheld communication device 300. Movement at an auxiliary user input 328 of the handheld communication device 300 is sensed and which is indicative of the user's desire to affect diagonal movement of the highlighting cursor 71 from a currently highlighted icon 73 on the display screen 322 to a diagonally located icon 75 on the display screen 322 of the handheld communication device 300. The movement is described as being "at" the auxiliary user input 328 to cover such situations as when the input is a touchpad or similar device since no portion of that type of input device actually moves, but the user's finger indicatively moves relative thereto (across the touchpad).

As in the previously described method, x-direction signals and y-direction signals are produced based on the sensed movement at the auxiliary user input 328. Again, the highlighting cursor 71 is held steady on a presently highlighted icon 73 on the display screen 322 while processing the x-direction signals and y-direction signals until a predetermined criterion is met for discriminating whether the user has indicated movement to an icon left or right of the presently highlighted icon 73, above or below the presently highlighted icon 73, or diagonally positioned relative to the presently highlighted icon 73. Diagonal movement of the highlighting cursor 73 is then affected between diagonally positioned icons on the display screen 322 of the handheld communication device 300 when diagonal cursor movement is discriminated to have been user indicated. In other respects, this embodiment is similar to that which has been earlier described.

In yet another embodiment, the apparatus of a handheld communication device 300 is disclosed that is capable of affecting diagonal movement of a highlighting cursor 71 amongst an array of icons 70 on a display screen 322 of the handheld communication device 300. The display screen 322 is located above a keyboard 332 suitable for accommodating textual input to the handheld communication device 300 and an auxiliary user input 328 is located essentially between the display 322 and keyboard 332. Sensors 72, 78 (74, 76) are provided that are capable of sensing movement at the auxiliary user input 328 indicative of the user's desire to affect diagonal movement of the highlighting cursor 71 from a currently highlighted icon number 73 on the display screen 322 to a diagonally located icon 75 on the display screen 322 of the handheld communication device 300. The sensors produce x-direction signals and y-direction signals based on the sensed movement at the auxiliary user input 328. A processor 338 is included that is capable of analyzing the produced x-direction signals and y-direction signals and outputting a cursor control signal that holds the highlighting cursor 71 steady on a presently highlighted icon 73 on the display screen 322 during the processing and until a predetermined criterion is met for discriminating whether the user has indicated movement to an icon left or right of the presently highlighted icon, above or below the presently highlighted icon 73, or diagonally positioned relative to the presently highlighted icon numeral 73 and then affecting diagonal movement of the highlighting cursor number 71 between diagonally positioned icons on the display screen of the handheld communication device 300 when diagonal cursor movement is discriminated to have been user indicated.

As mentioned hereinabove, there are situations in which the user will not want the X and Y signals to be converted into diagonal movement generating signals. For example, when navigating a map scene or other type of image, fine directional movement from the navigation tool will be most desired; otherwise the "collection" of X and Y signals produces undesirable "jerky" cursor movement. Therefore, in at least one embodiment, the diagonal movement feature can be turned on and off by the user, or be automatically set in dependence upon the application that is being cursor-traversed.

Figure 15:
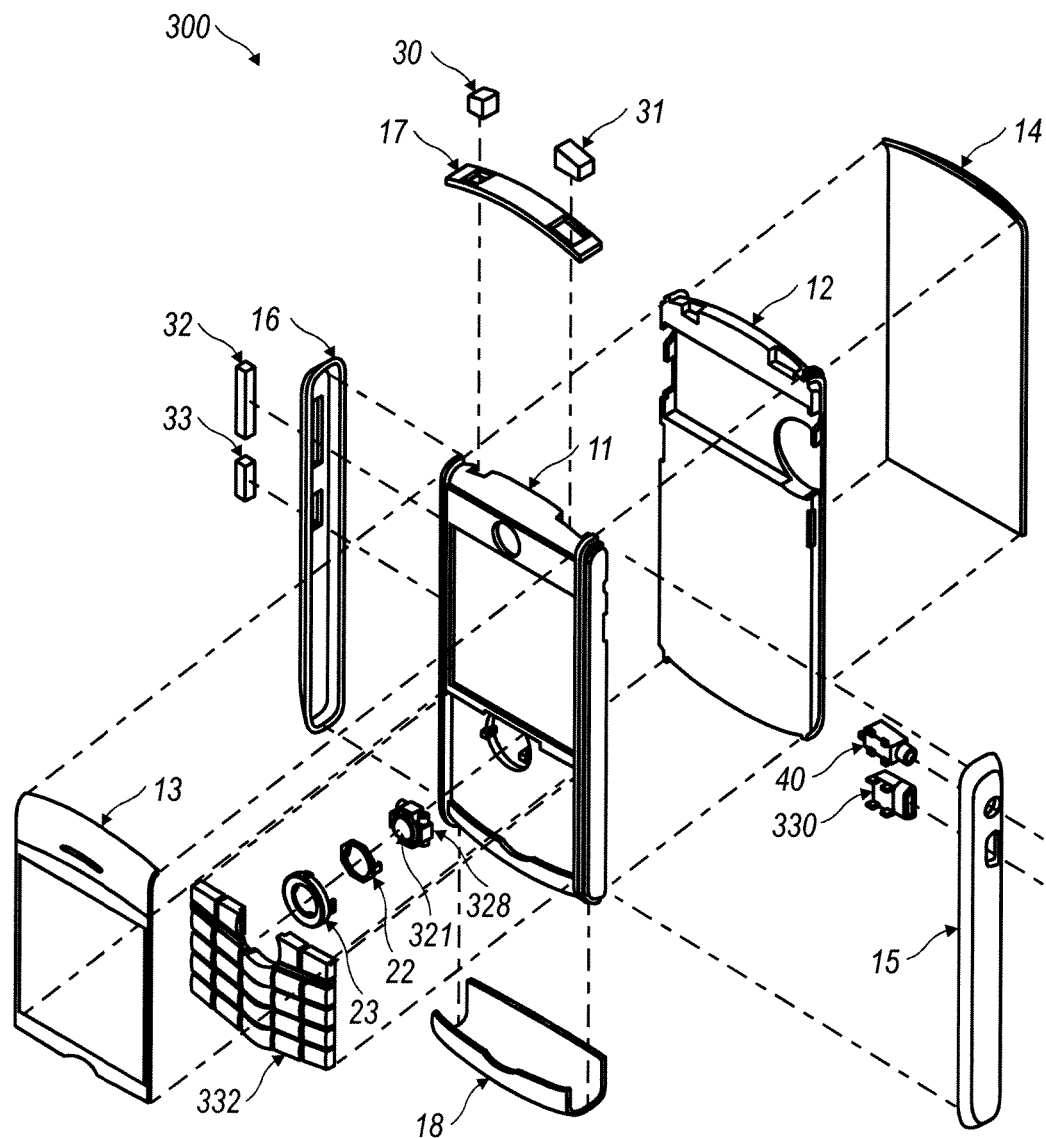
FIG. 15 is an exploded perspective view of an exemplary wireless handheld electronic device incorporating a trackball assembly as the auxiliary user input.

The integration of the trackball assembly into handheld device 300 can be seen in the exploded view of FIG. 15 showing some of the typical components found in the assembly of the handheld electronic device 300. The construction of the device benefits from various manufacturing simplifications. The internal components are constructed on a single PCB (printed circuit board) 12. The keyboard 332 is constructed from a single piece of material, and in a preferred embodiment is made from plastic. The keyboard 332 sits over dome switches (not shown) located on the PCB 12 in a preferred embodiment. One switch is provided for every key on the keyboard in the preferred embodiment, but in other embodiments more than one switch or less than one switch per key are possible configurations. The support frame 11 holds the keyboard 332 and navigation tool 328 in place above the PCB 12. The support frame 11 also provides an attachment point for the display (not shown). A lens 13 covers the display to prevent damage. When assembled, the support frame 11 and the PCB 12 are fixably attached to each other and the display is positioned between the PCB 12 and support frame 11.

The navigation tool 328 is frictionally engaged with the support frame 11, but in a preferred embodiment the navigation tool 328 is removable when the device is assembled. This allows for replacement of the navigation tool 328 if/when it becomes damaged or the user desires replacement with a different type of navigation tool 328. In the exemplary embodiment of FIG. 1, the navigation tool 328 is a ball 321 based device. Other navigation tools 328 such as joysticks, four-way cursors, or touch pads are also considered to be within the scope of this disclosure. When the navigation tool 328 has a ball 321, the ball 321 itself can be removed without removal of the navigation tool 328. The removal of the ball 321 is enabled through the use of an outer removable ring 23 and an inner removable ring 22. These rings 22, 23 ensure that the navigation tool 328 and the ball 321 are properly held in place against the support frame 11.

A serial port (preferably a Universal Serial Bus port) 330 and an earphone jack 40 are fixably attached to the PCB 12 and further held in place by right side element 15. Buttons 30-33 are attached to switches (not shown), which are connected to the PCB 12.

Final assembly involves placing the top piece 17 and bottom piece 18 in contact with support frame 11. Furthermore, the assembly interconnects right side element 15 and left side element 16 with the support frame 11, PCB 12, and lens 13. These side elements 16, 15 provide additional protection and strength to the support structure of the device 300. In a preferred embodiment, backplate 14 is removably attached to the other elements of the device.

In one respect, the present disclosure is directed toward a method for displaying an abbreviated menu on the screen of a handheld electronic device 300 at the request of the user. Typical examples of such devices include PDAs, mobile telephones and multi-mode communicator devices such as those capable of transmitting both voice and text messages such as email. The method includes displaying a cursor-navigable page on a screen 322 of a handheld electronic device 300. One example would be the text of an open email message 620, see FIG. 5C. Next, the user initiates an ambiguous request for the display of menu options corresponding to the displayed page while a cursor is positioned at a location on the page that is not visually signified for menu display actuation. For instance, with the screen cursor positioned upon the body of the open email message 620, but where there is no visual indicator that the location is one which will cause a menu to be displayed if actuated, an action is taken such as pressing a button on the device 300 that indicates the user's desire to take action with respect to the displayed page (open email message 620). There are several actions which might be taken with respect to the open email message 620, but none has been specified; therefore, the request is termed ambiguous. Responsively, the device 300, under the control of an included microprocessor 338, displays a short menu 624 having a first list of menu items which is a subset of a second list of menu items that make up an extended menu 618 associated with the displayed page, see FIGS. 5d, 5e. This first list of menu items has been assessed a higher probability for being user-selected or desired than at least some of the remaining items of the second list. This means that there is a long list (the second list) of actions that might be taken when the email message is displayed, but there is also a predefined short subset (the first list) of actions of this long list which have been assessed to be more frequently selected/desired, so it is this short listing of selectable actions that is displayed in response to the user's ambiguous request since one of the available actions on the short list is likely to satisfy the user's need.

In at least one version of the device 300, the user's ambiguous request is made through an auxiliary user input device 328 on the handheld electronic device 300. One example of the auxiliary user input device 328 is a navigation tool, such as a trackball 321, that controls movement of the cursor on the screen 322 of the handheld electronic device 300.

The device 300 may also include an input that issues a non-ambiguous request to display the extended menu 618 associated with the displayed page, and which may be simply constituted by an actuable button or the like.

In order to facilitate usability, it is also contemplated that selectable items on the short listing can include choices to expand the short menu 624 to the extended menu 618, or to close the short menu 624. In order to reinforce the commonality between the extended menu 618 choice on the short list and the dedicated push-button for the long list, each is marked with a similar insignia.

In order to take full advantage of the small screen 322 of the handheld device 300, the short menu 624 is displayed on the screen 322 in place of the displayed page, and preferably fills a substantial entirety of the screen 322.

Benefits of the disclosed hierarchical menu system include the ability to implement a hierarchical menu on devices having varying screen sizes, including small-screen devices. The disclosed hierarchical menu permits the display of one menu at a time. In an almost intuitive manner, the methods disclosed allow the user to make an ambiguous selection to directly open a particular item on a displayed page or to display a short menu 624 of items typically used with a displayed page. This reduces user confusion and enhances usability of the system. By using a "menu" item on the short menu 624 or a menu key 606, the user always has the option to view the extended menu 618 associated with the displayed page. By using a "back" menu item or key 608, the user can navigate to previously displayed menus within the string of historically selected menus without cluttering the displayed menus with such historical items.

The menuing task is generally performed by a menuing subsystem or hierarchical menu module 412 of an operating system 408 executing on a handheld electronic device 300. Accordingly, as illustrated relative to the handheld electronic device 300 of FIG. 2, a hierarchical menu module 412 is implemented as part of the operating system 408. In general, the module 412 is configured to receive menu calls from various applications 358 and to service those calls by displaying a menu on a display screen 322 according to the parameters provided by the application 358 making the menu call. Although module 412 is illustrated as being part of operating system 408, it is noted that the module 412 might also function as a stand-alone module 412 stored in memory 324 and executable on a processor 338. In general, although the functioning of module 412 as part of operating system 408 is preferred, it is not intended as a limitation regarding its implementation by a handheld electronic device 300.

In addition to managing typical menuing functions, the hierarchical menu module 412 implements a hierarchical menu in accordance with application programs 358 that support hierarchical menus. Thus, for applications 358 designed to provide hierarchical menus, hierarchal menu module 412 is configured to implement those hierarchical menus as hierarchical menus with ambiguous selection. The implementation of a hierarchical menu as a hierarchical menu with ambiguous selection can occur automatically for any application 358 making a hierarchical menu call to operating system 408. Alternatively, it can occur based on a specific request from an application 358 to implement the hierarchical menu as a hierarchical menu with ambiguous selection. Thus, handheld electronic device 300 manufacturers can configure the devices to automatically provide hierarchical menus which facilitate application developers. This enables application developers to design hierarchical menus, both extended 618 and short 624, in a typical manner without making any changes to their application 358 source code. Alternatively, handheld electronic device 300 manufacturers can configure devices 300 to provide hierarchical menus with ambiguous selection by default, or upon request for application 358 developers. This enables application 358 developers to design hierarchical menus in a typical manner and further allows them to determine if application 358 menus will be implemented as hierarchical menus with ambiguous selection by making a simple selection through their application source code to identify what action should occur in response to an ambiguous selection and populate short menus 624 with preferably those actions, tasks or other commands most commonly used with respect to the displayed page on the screen 322.

Referring to FIGS. 1, 3a, 3b, 4, and 5a-5e, the following is a discussion and comparison of the use of the extended 618 and short 624 menus on the handheld electronic device 300.

In the embodiment depicted in FIG. 1, the device 300 has a first input controller, which is preferably an auxiliary I/O subsystem 328 having a depressible rolling member or trackball 321, which is used to access the short menu 624. The handheld device 300 also has a second input controller, in this case menu key 606, which is used to access the applicable extended menu 618. These menus 618, 624 are based on the interface principle of see and click. In this manner, users do not have to remember commands or options because they can view these options at any time.

FIG. 1 also depicts a display screen 322 and keyboard 332. The display screen 322 serves as a user interface (UI) visually presenting information to the user. The trackball 321 and the menu key 606 are part of the input portion. To the right of the trackball 321 is a back key 608, which is used to back-up through previous screens or menus displayed on the display screen 322.

Figure 3A:
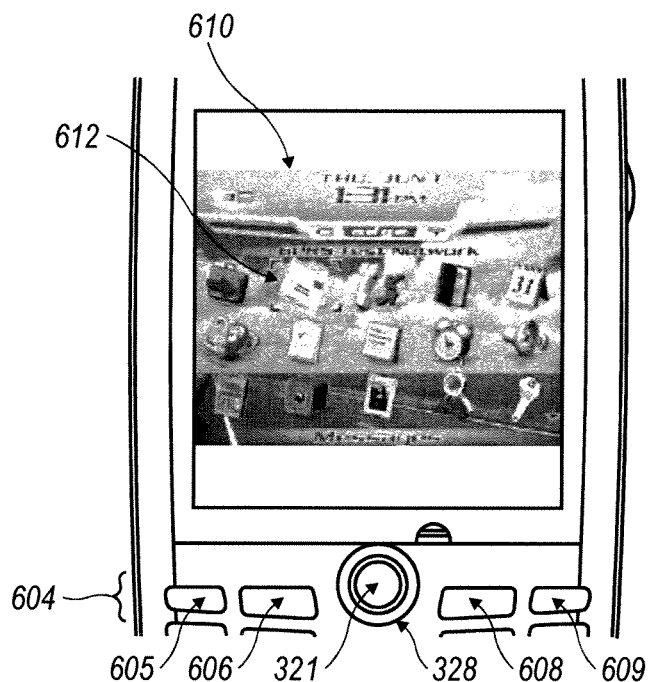
FIG. 3a is a device-displayed home screen which shows a set of icons representing various applications available on the device and the email icon is selected.
Figure 3B:
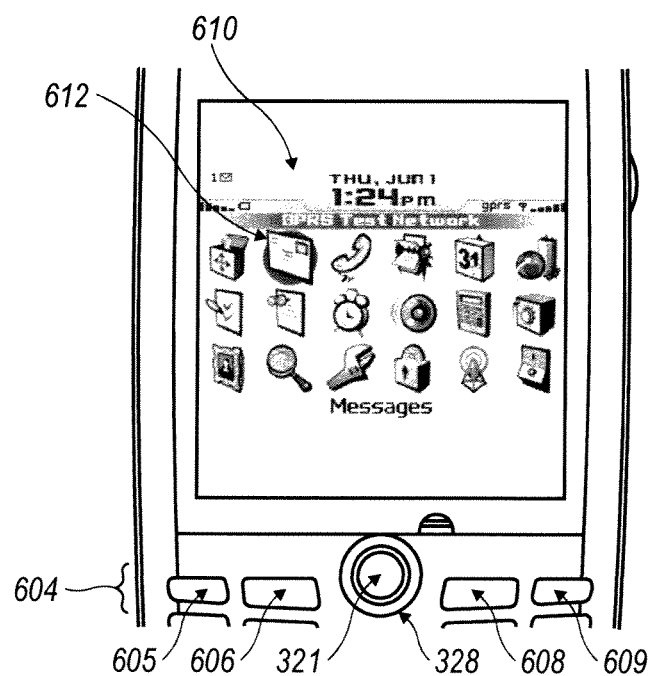
FIG. 3b is a device-displayed home screen which shows another set of icons representing various applications available on the device and the email icon is selected.

The initial screen for the device 300 is a home screen 610. Two examples of a home screen 610 are shown in FIGS. 3a and 3b, which show different sets of icons representing various applications 358 that are available on the device 300. The user can perform desired high-level activities from the home screen 610, and within an application 358 explore and access functionality of the selected application 358.

The menu key or button 606 is to the left of the trackball 321 and activates an extended menu 618 that lists actions likely desirable relative to the presently displayed screen 610. The menu key or button 606 provides a consistent location where the user can look for commands. Each application 358 has its own extended menu 618 consisting of application-specific menus.

Clicking (depressing) the trackball 321 when an icon on the home screen 610 is highlighted opens the application 358, preferably to a common page used by users. For example, if the email message's icon 612 is highlighted, then a page listing the messages 616 will open (See FIG. 5a). When not on the home screen 610, but while a page of an application 358 is displayed without a menu showing, clicking the trackball 321 is referred to as an ambiguous selection since several commands may apply in that circumstance. This ambiguous selection will cause a short menu 624 to appear on the display screen 322. The short menu 624 contains a list of menu items that are preferably the most commonly used commands in the present screen context. These short menus 624 again are based on the interface principle of see and click. The options or menus change according to the task at hand.

The items shown in these short menus 624 preferably are those that a user performs frequently. In other embodiments, the short menu 624 is selected based on either predefined user or programmer preference. These short menus 624 are preferably correctly organized, worded clearly, and behave correctly in order for the user to understand what options they should expect to see, and how to access the additional functionality specific to the selected application 358.

Figure 5A:
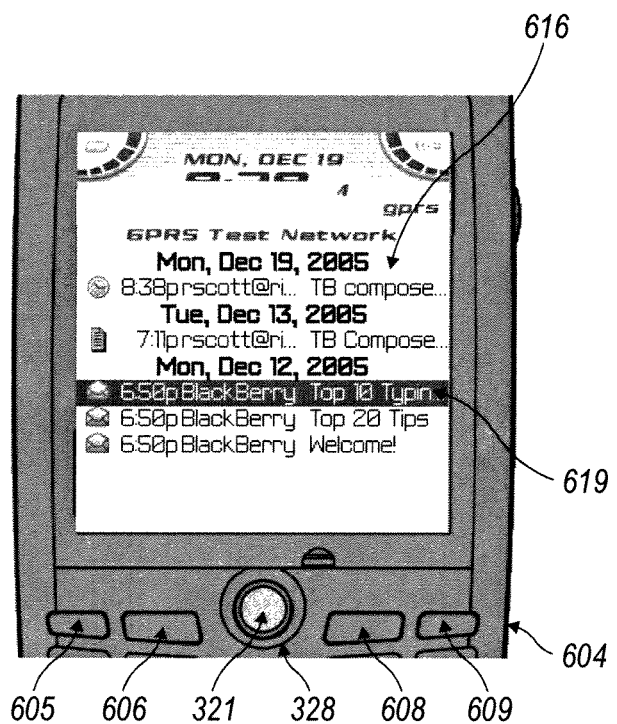
FIG. 5a is a device-displayed email listing.
Figure 5B:
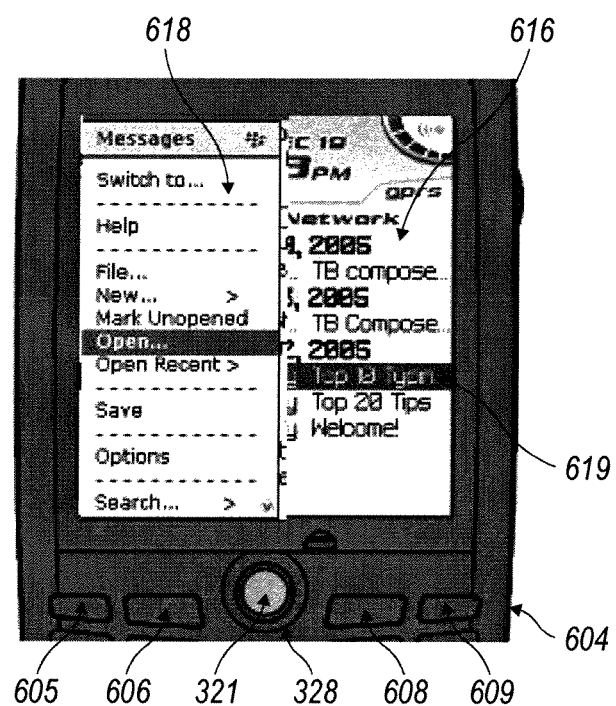
FIG. 5b is a device-displayed extended menu relevant to the email listing.
Figure 5C:
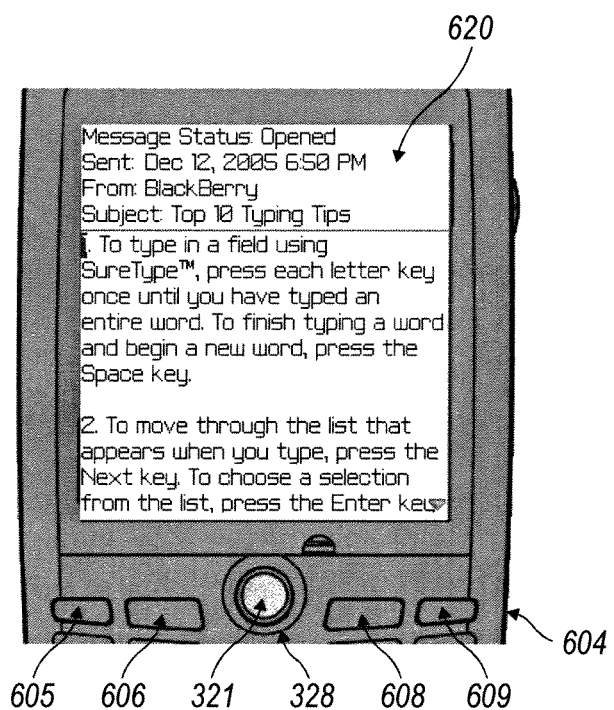
FIG. 5c is a device-displayed open message chosen from the email listing.
Figure 5D:
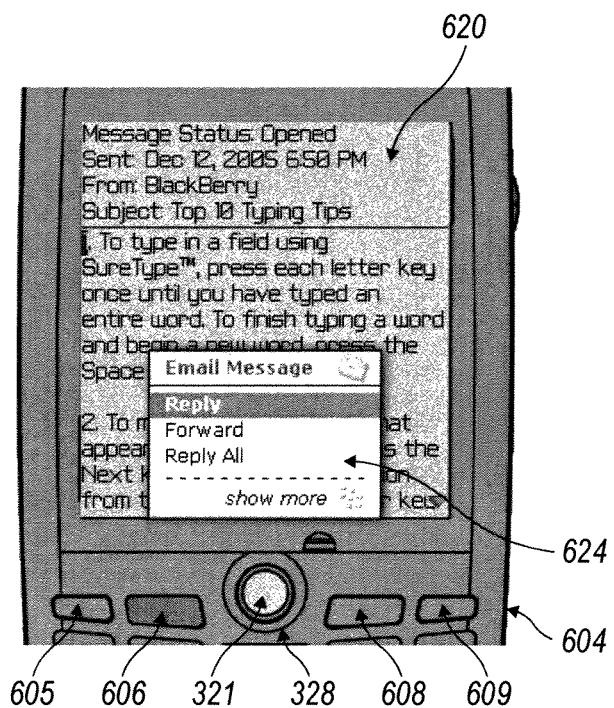
FIG. 5d is a user requested short menu that presents frequently desired actions relative to an open email message.
Figure 5E:
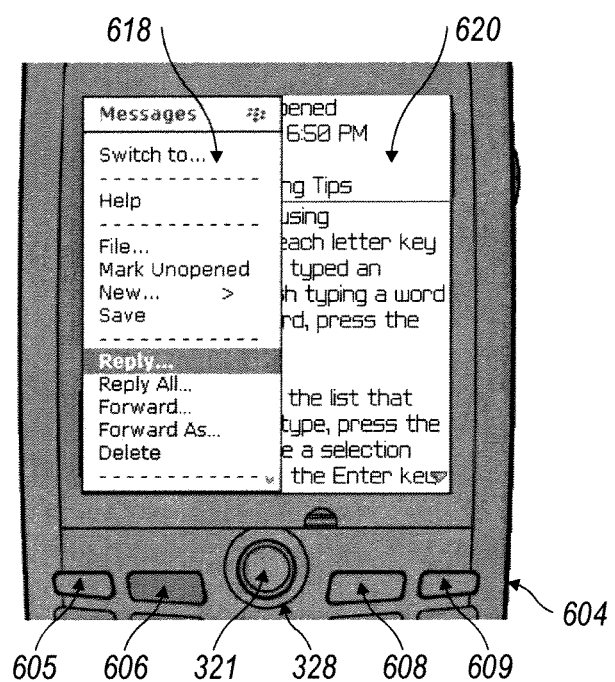
FIG. 5e is an extended menu that presents further options relevant to an open email message which was displayed based on a user selection of the "show more" option of FIG. 5d.

In at least one embodiment, the items displayed in the short menu 624 are dynamically updated depending upon the user's selection of items from the extended menu 618 (See FIGS. 5d and 5e). As items are repeatedly selected from the extended menu 618, the menu items are ranked and depending upon their frequency of selection will relatively appear in the short menu 624. The number of items in the short menu 624 is preferably between two and ten items. The items displayed in the short menu 624 can also be user selected in one embodiment.

In another embodiment, the information for the short menu 624 is stored locally as well as at a central location. The transmission of the short menus 624 that are applicable for the particular user is via a communication system as described below. The information stored at the central location allows the user to access that information on multiple devices. This will allow the user to experience identical menus on different devices. This is helpful when a user would like to encounter the same interface, but uses the devices in different ways. The information alternatively may be stored on a memory card and transferred between devices via the memory card.

For purposes of example, in the following disclosure, the use of the menus 618, 624, trackball 321 and keys are discussed relative to the use of an email message application 358.

Figure 4:
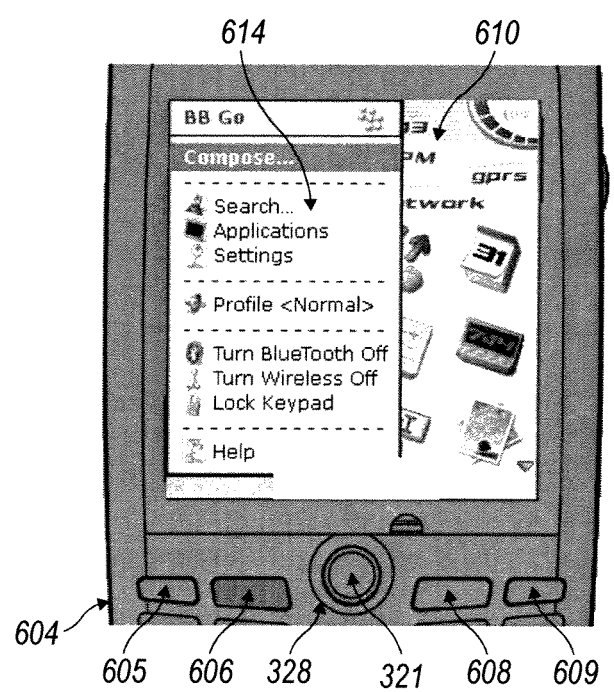
FIG. 4 is a device-displayed high level extended menu associated with the email icon on the home screen.

Initially, the user uses the trackball 321 to scroll to the desired application 358. In this case, it is the email messaging application 358. In FIGS. 3a and 3b, the email icon 612 (a letter envelope) is highlighted in a conventional manner, for example, with a frame as shown in FIG. 3a or with a highlighted background as depicted in FIG. 3b. Then, the menu key 606 is activated by depressing or "clicking" it, which brings up a high level extended menu 614 as shown in FIG. 4. This menu 614 can include the following menu items:

Compose . . .
Search . . .
Applications
Settings
Profile <Normal>
BlueTooth On/Off
Wireless On/Off
Key Lock On/Off
Help For example, clicking on "Compose" would initiate the address book function 352 and allow the user to select an addressee, select the type of message (email, SMS, IM, etc.) and proceed with the composition of a message. However, for the present example, the user desires to open their email message mailbox and view a list of email messages 616. In another embodiment, the menu includes the option "close," which will close the menu. Preferably, the option to close the menu is listed near the bottom. This enables closing of the menu without requiring the use of an additional key to close the menu.

To do this, the menu key 606 is clicked again and the high level extended menu 614 for the email messaging application 358 is displayed, as shown in FIG. 4. If the menu item "Open" is not already highlighted, then the trackball 321 is used to scroll to this item such that it is highlighted. Once the menu item "Open" is highlighted, the trackball 321 is clicked. A list of email messages 616 is displayed on the screen 322 as shown in FIG. 5a.

In order to open and read a particular email message, the trackball 321 is then used to scroll to the desired email message 619 in the displayed list causing it to be highlighted. The menu key 606 is clicked and the extended menu 618 is displayed, for example as shown in FIG. 5b. If the menu item "Open" is not already highlighted, then the trackball 321 is used to scroll to this item such that it is highlighted. Once the menu item "Open" is highlighted, the trackball 321 is clicked. The desired message 620 is displayed on the display screen 322 as shown in FIG. 5c.

The user then decides what to do as a result of reading the message. To perform the next action, the user clicks the menu key 606 and another extended menu 618 appears as shown in FIG. 5e. If not already highlighted, the user then scrolls to the desired menu item using the trackball 321 until the desired menu item (action or task) is highlighted. Then, the user clicks the trackball 321 to activate the desired action or task.

The use of the short menu 624 usually requires fewer clicks to perform the same action as compared to the use of solely the extended menus 618. For example, the following is an embodiment using the ambiguous selections and/or short menus 624 to open the email messaging application 358 and to open a particular email message.

Starting from the home screen or menu 610, the trackball 321 is used to scroll to and highlight the email message icon 612 as shown in FIGS. 3a and 3b. Clicking the trackball 321 directly opens the list of messages 616 as shown in FIG. 5a. The trackball 321 is clicked while no menu is present and this action is an ambiguous selection since more than one action or task is possible. This ambiguous selection while on the home screen 610 and with the email icon 612 highlighted is treated by the hierarchal menu module 412 as a direction or command to open the highlighted application 358. In this embodiment, it is believed that the user is attempting to perform the task of opening the email application program 358 and the hierarchal menu module 412 is programmed accordingly. Displaying the list of emails 616, as shown in FIG. 5a, is the action or task believed to be the most common desired, and thus to the user, the procedure appears intuitive. Such ambiguous selection for other application 358 is preferably programmed with the most common desired task or action for the selected application 358.

In this regard, it is appreciated that opening the email message list 616 took two clicks and one scrolling using the extended menus 618, whereas with the ambiguous selection routine of the hierarchal menu module 412 this was reduced to just a single click.

Now, with the email message list 616 on the display 322, the user scrolls to the desired email message, clicks with the trackball 321, and the desired open email message 620 is displayed on the screen 322, as shown in FIG. 5c. Again, there is no menu on the display 322 and the action is an ambiguous selection since more than one action or task is possible.

In this regard, it is also appreciated that opening a desired email message took two clicks and possibly a scroll, whereas with the ambiguous selection routine of the hierarchal menu module 412, this was reduced to just a single click.

While the user is viewing the open email message 620 on the display screen 322 after having read its contents, the user clicks the trackball 321 making another ambiguous selection, again since no menu is on the display screen 322 and more than one action or task is possible. This ambiguous selection causes the menu program to display a short menu 624, preferably of menu items corresponding to actions or tasks commonly performed by users at that point. In this embodiment, a short menu 624 is shown in FIG. 5d, and contains the actions or tasks—"Reply", "Forward" and "Reply All." The user then decides which action or task to perform and scrolls to it and clicks the trackball 321. Novice and experienced users alike benefit from the reduction in information displayed on the short menu 624 through the removal of less commonly used tasks. The short menu 624, as shown in FIG. 5d, contains a title "Email Message," thus providing information about the application 358 that is associated with the menu. Likewise, other titles for other menus would be appropriate at times when menus are displayed in connection with other applications 358. In other embodiments, the short menu 624 features the menu item "close" in addition to those items described above.

Thus, the short menu 624 provides convenient access to the high level, most often-used commands associated with an application 358. The short menu 624 that is displayed can also depend on the position of the cursor within the displayed page. The short menu 624 can be considered as a shortcut to commands that make sense to the task at hand. In some cases, when on the home screen 610, rather than opening the indicated application 358, a short menu 624 can be displayed with the more common subset of actions, tasks or other commands by affecting an ambiguous request by clicking on a highlighted application 358 icon on the home screen 610.

If the desired action or task is not listed on the short menu 624, the user can click the menu key 606 to view the extended menu 618, such as shown in FIG. 5e using the exemplary email messaging scenario. Alternatively, the short menu 624 can have a menu item that allows the user to scroll to and select the item as shown in FIG. 5d. Once that menu item has been selected, then the extended menu 618 replaces the short menu 624. For example, the short menu 624 in FIG. 5d has a menu item "show more" for this purpose. The name of this menu item can be any other that conveys a similar meaning, such as "Full" or "Extended" or an icon that is used by the device 300 provider and identified in its literature to have that meaning. Likewise, the menu key 606 in a preferred embodiment features an icon or the like that is shown next to the "show more" menu item.

Other applications of short menus 624 are possible as well. Another example of the use of a short menu 624 is when the device 300 features soft keys that can be user customized. Since these soft keys are user customizable, a short menu 624 can be activated when the soft key is activated two times without any additional user input and/or within a predefined time period. The short menu 624 would present options to change the soft key to bring up different program options. The short menu 624 likewise could feature the extended menu 618 features and close options mentioned above.

Example methods for implementing an embodiment of a hierarchical menu and ambiguous selection will now be described with primary reference to the flow diagram of FIG. 6. The methods apply generally to the exemplary embodiments discussed above with respect to FIGS. 3a, 3b, 4, 5a-5e. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor 338. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), a portable compact disc read-only memory (CDROM) (optical), and a solid state storage device (magnetic; e.g., flash memory).

Figure 6:
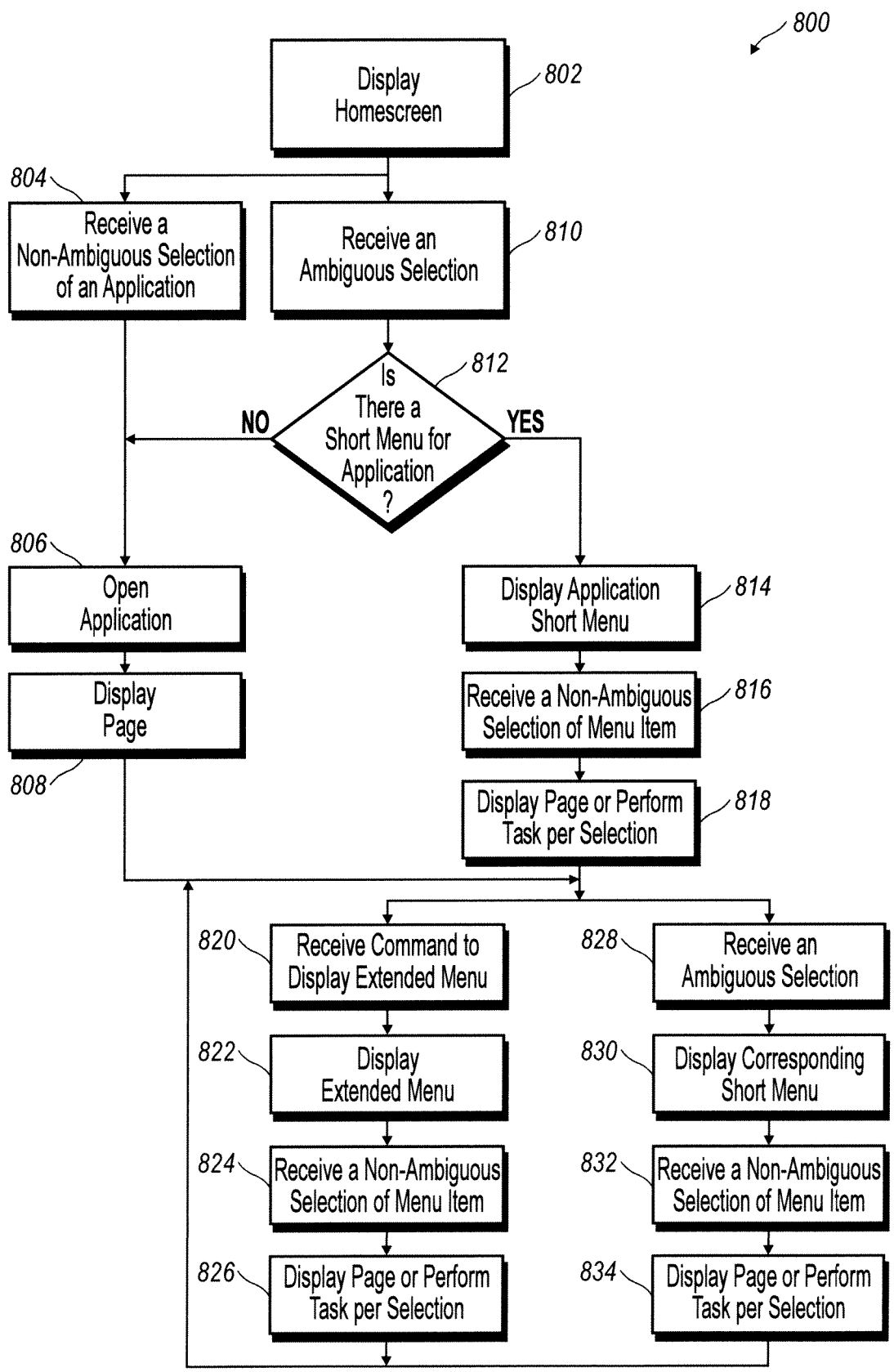
FIG. 6 is a flow chart representative of a hierarchical menu process.

FIG. 6 illustrates an exemplary method 800 for implementing a hierarchical menu with ambiguous selection on a handheld electronic device 300, PDA, or other similar device having a small display screen 322. The method 800 describes a hierarchical menu process that could continue well beyond the number of submenus that are discussed in the method itself. Thus, the extent of method 800 is not intended as a limitation. Rather, the extent of method 800 is intended to generally express the manner by which a hierarchical menu with ambiguous selection can be implemented in lesser and greater degrees of size and complexity.

Initially, a home screen 802 is displayed on the display screen 322. The user scrolls to a particular application using a navigation tool. The user can then depress the menu key 606 to initiate a non-ambiguous selection 804 of that particular application 358 that is received by the method 800. The method 800 then causes the selected application 358 to open an application 806 and display a page 808 on the display screen 322. Alternatively, the user can make an ambiguous selection 810. For example, if the navigation tool is a trackball 321 having a depressible rolling member, the user depresses the rolling member when no menu is present. The method 800 receives the ambiguous selection 810 and then must determine whether there is a short menu for this application 812. If there is no short menu 624, then the method 800 causes the application to open 806 and display a page 808. If there is a short menu 624, then the method causes the display of the applications short menu 814. The user then scrolls to the desired menu item and depresses the rolling member. The method 800 receives a non-ambiguous selection of the menu item 816 and either displays a page or causes the computer to perform the task selected 818.

Once a page is displayed 808, 818, the user again has two choices. The user can depress the menu key 606 and the method 800 receives a command to display an extended menu 820 corresponding to the displayed page. The method 800 then displays that extended menu 822. The user then scrolls to a particular menu item and depresses the rolling member which causes the method 800 to receive a non-ambiguous selection of the menu item 824. The method 800 then displays a page or performs the task per the selection 826. Alternatively, the user can depress the rolling member with no menu displayed causing an ambiguous selection 828. The method 800 receives this ambiguous selection 828 and causes the display of a corresponding short menu 830, or the method 800 can be programmed to perform a particular task that is the most common for the displayed page (not shown in FIG. 6). With the short menu 624 displayed, the user can then scroll to the desired menu item and depress the rolling member to generate a non-ambiguous selection. The method 800 receives the non-ambiguous selection of the menu item 832 and causes the display of a page or performance of a task per the selection 834.

If the user is presented with another displayed page, the user can repeat steps 820 through 826 or 828 through 834, depending on whether the user uses an extended menu 618 or short menu 624, respectively.

Once the particular activity is completed, the user can use the back key 608 to navigate back through the various pages displayed until the user reaches a page from which the user can perform another activity or select another application 358 upon reaching the home screen 802. The device can be equipped with an escape key to go to the home screen 802 directly. Alternatively, an ambiguous selection to display a short menu or a non-ambiguous selection can be made to display a short or extended menu that has a home screen menu item.

Applications of the short menu 624 described above in relation to email can take the form of the several embodiments described hereinbelow. One embodiment takes the form of a handheld electronic device 300 that is programmed to display, upon user request, an abbreviated menu 624 of user-selectable actions 1000 relative to a page on the display screen 322 of the device 300. The abbreviated menu 624 addressed in the following embodiment(s) has also been described as a short menu 624, the details of which are further explained below. In these regards, a user-selectable action 1000 refers to an action that the user wishes to be taken relative to the displayed page, for example saving the page.

This user-selectable action 1000 can be, for example, indicated by the user through the actuation of an auxiliary input device 328 such as a trackball 321 or thumbwheel.

Handheld electronic devices 300 are designed to have a user interface that accommodates cursor navigation on a particular page inside one of the various applications running on the handheld electronic device 300. Some examples of programs 358 that these devices 300 feature include but are not limited to an email program, an address book 352, a task manager, a calendar, a memo pad and a browser. Some applications, such as the task manager, may feature forms that can be filled with information entered by the user. Other programs, such as the browser, may display data from a remote source.

In order to navigate the displayed page, an auxiliary user input device 328 is provided on the device 300. This auxiliary user input device 328 can be a navigation tool including a trackball 321, thumbwheel, navigation pad, cursor keys and the like. These auxiliary user input devices 328 allow the user to navigate and make selections/requests.

As a general starting point, a cursor-navigable page is displayed on the display screen 322 of the handheld electronic device by an application 358 running on the device 300 and the user initiates an ambiguous request corresponding to the displayed page. One exemplary cursor-navigable page is shown in FIG. 7.

In one embodiment, the user of the handheld electronic device 300 initiates the ambiguous request through the use of an auxiliary user input device 328. The auxiliary user input device 328 can be one of the navigation tools, such as the trackball 321, described above.

As described above, the handheld electronic device 300 contains a microprocessor 338. This microprocessor 300 has a control program, such as an operating system 408 for the device 300 associated therewith for controlling operation of the handheld electronic device 300. The control program is configured to process an ambiguous request for the display of menu options associated with the displayed page based upon detection of a user menu request. The ambiguous request, as described above, occurs when there are multiple actions that a user is capable of taking. The control program can determine whether the request is ambiguous depending upon cursor position, such as in this case where a cursor is on the screen-displayed page. An example of detection of a user menu request by the control program is when the user depresses/actuates the trackball 321 thereby indicating a request for a list of menu options.

Once the detection of the user menu request has been made, the microprocessor 338 displays an abbreviated menu 624 having a short list 624 of menu options which is a subset of a full menu 618 of options of user-selectable actions 1000 available relative the screen-displayed page. The user-selectable actions 1000 of the short list 624 of menu options are those options that have been assessed to have a higher probability for being user-selected than at least some of the user-selectable actions 1000 of the full menu 618 of options that are not included in the short list 624 of menu options. Thus, the short list 624 contains items that a user of the handheld electronic device 300 is more likely to use than some of the items shown on the full or extended menu 618. Further details regarding the selection of those items for a short menu 624 are provided above.

In at least one embodiment, the short list 624 of menu options that are displayed when the user makes the menu request comprises one menu item 634 and optionally a full menu item 635. The one menu item 634 is a menu item that has been assessed as the most likely user desired menu item from the full menu 618. The full menu option 635 allows the user to request a full or extended menu 618. In another embodiment, the short list 624 of menu options consists of one menu item 634 while in yet another embodiment, full menu 635 is added to this closed listing of possible actions. In yet another embodiment, the short list 624 of menu options consists of save while in yet another embodiment, full menu 635 is added to this closed listing of possible actions The one menu item 634 as mentioned above is determined based upon the particular application running on the device 300 and in some embodiments additionally based upon cursor position on the cursor-navigable page. As an example, in a task application 640 once the desired information has been entered into the form presented on the screen 332 the user would like normally like to save the entry. Thus, the one menu item 634 in this scenario would be 'save'. Optionally, the 'full menu' 635 is presented as well and enables the user to request the full or extended menu 618. Additionally, other single menu items 634 can include paste, close, and open. Like the save and other one menu items they can be supplemented with a full menu option 635. The one menu item aids the user when performing specific tasks that the user would like to have additional feedback from or control over. For example, when the one menu item is a save item, the user would like some confirmation that the document, file, or object was saved. Additionally, when the close item is the one menu item, the user will be taken to a different program or location on the user interface and would like to be informed that such action is about to take place.

In at least one embodiment, the short menu 624 is sized so that it fills a substantial entirety of the display screen 322. In yet another embodiment, the short menu 624 is sized so that it overlaps the displayed page on the display screen 322. The size of the short menu 624 in relation to the display screen 322 can change depending upon the size of the display screen 322. When the device 300 is sized as described below, the short menu 624 often fills a large portion of the display screen 322. The amount of the display screen 322 that the short menu 624 occupies is contemplated to preferably range between 10% and 70%. Other sizes can also enable the user to be used that easily read the menu 624, 618 while still being able to see the underlying data displayed on the screen 322 as well. While in another embodiment, the abbreviated menu 624 is displayed on the screen 322 in place of the displayed page.

In order to facilitate entering of text associated with the displayed page and the like, a keyboard 332 is located below the display screen 322 and configured to accommodate textual input to the handheld electronic device 300. This keyboard 332 can either be a full or reduced keyboard as described below. Furthermore, a navigation tool in one embodiment is located essentially between the keyboard 332 and the display screen 322 of the handheld electronic device 300. This navigation tool can be an auxiliary input device 328 including those mentioned above. The navigation tool can further be advantageously widthwise centered on the face of the device 300.

Preferably, the handheld electronic device 300 is sized for portable use. In one embodiment the handheld electronic device 300 is sized to be cradled in the palm of the user's hand. The handheld electronic device 300 is advantageously sized such that it is longer than wide. This preserves the device's 300 cradleability while maintaining surface real estate for such things as the display screen 322 and keyboard 332. In a development of this embodiment, the handheld electronic device 300 is sized such that the width of the handheld electronic device 300 measures between approximately two and approximately three inches thereby facilitating the device 300 being palm cradled. Furthermore, these dimension requirements may be adapted in order to enable the user to easily carry the device.

Furthermore, the handheld electronic device 300 in an exemplary embodiment is capable of communication within a wireless network 319. Thus, the device 300 can be described as a wireless handheld communication device 300. A device 300 that is so configured is capable of transmitting data to and from a communication network 319 utilizing radio frequency signals. The wireless communication device 300 can be equipped to send voice signals as well as data information to the wireless network 319. The wireless communication device 300 is capable of transmitting textual data as well as other data including but not limited to graphical data, electronic files, and software.

Figure 8:
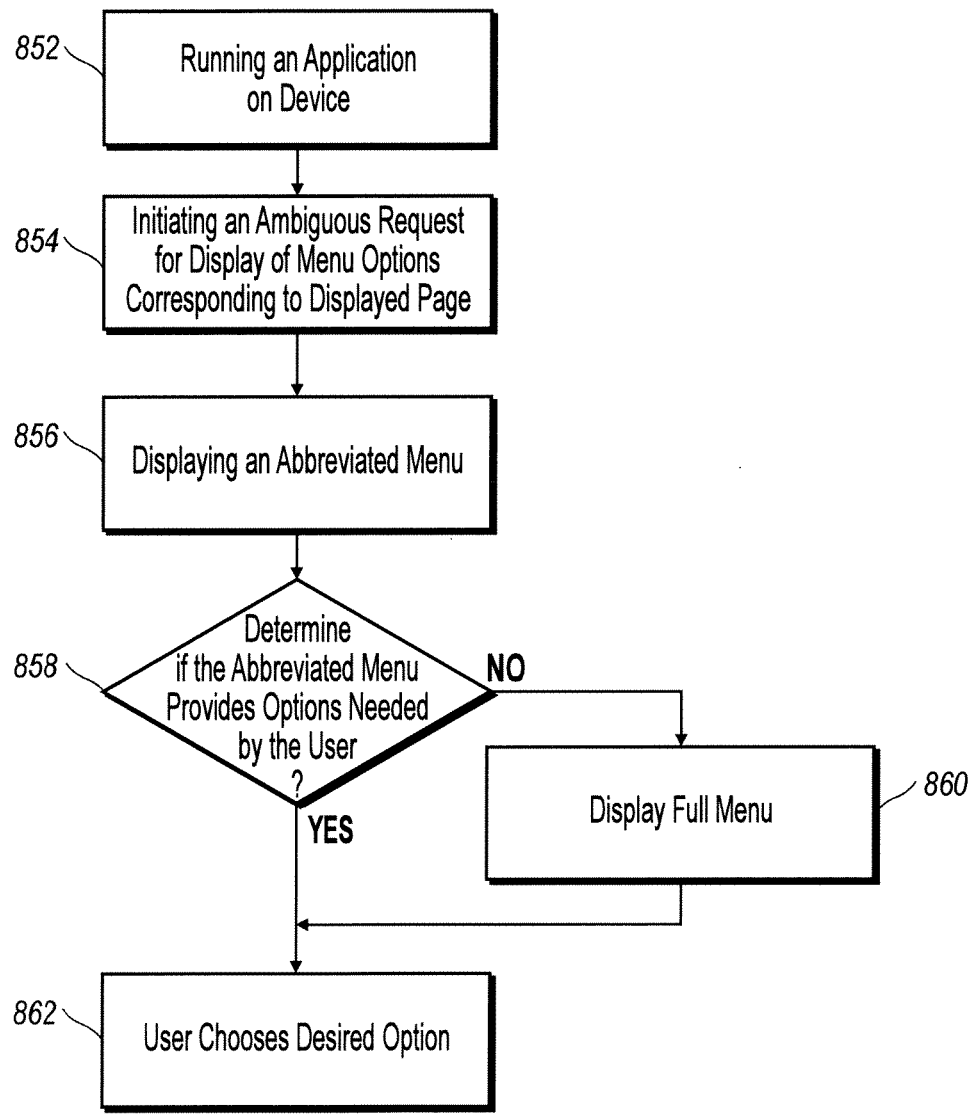
FIG. 8 further illustrates the hierarchical menu process depicted in FIG. 7.

Yet another embodiment takes the form of a method for causing, upon user request, the display of an abbreviated menu 624 having a short list of menu items on a display screen 322 of the handheld electronic device 300 when a currently running application 358 is presented on the display screen 322 of the device 300 as depicted in FIG. 8. First, the method includes running an application on a handheld electronic device and thereby causing display of a cursor-navigable page (block 852). Next, the method further involves initiating an ambiguous request for display of menu options corresponding to the displayed page (block 854). Furthermore, the method involves displaying an abbreviated menu having a short list of menu options (block 856). This short menu 624 as described above includes those options that have been assessed a higher probability for being user-selected than at least some of the user-selectable actions of the full menu 618. Thus, the short list 624 of menu options is a subset of a full menu 618 of options of user-selectable actions available relative to the displayed text entry page and the user selectable actions of the short list 624 of menu options having been assessed a higher probability for being user-selected than at least some of the user-selectable actions of the full menu 618 of options that are not included in the short list 624 of menu options.

In one embodiment, the short list includes one item 634 and optionally a full menu item 635. Then a determination is made whether the abbreviated menu provides options needed by the user (block 858). If the options needed by the user are not displayed then a full (long) menu having additional options is displayed (block 860). Once the appropriate menu options are displayed (block 858, 860), the user chooses the desired option (block 862).

In another embodiment, the short list 624 of the method consists of one item 634. In another example, the closed group further includes a full menu item 635, for expanding the listing of available action. In yet another embodiment, the short list 624 of the method consists of save and a full menu item 635.

In other embodiments, the method for causing display of a short menu 624 also includes the various features described above in relation to the handheld electronic device 300 embodiments. These various features include dimensional options, communication options, auxiliary input options and short menu 624 sizing as described above in relation to the handheld electronic device 300 embodiment.

Still another embodiment takes the form of a processing subsystem configured to be installed in a mobile communication device 300 comprising a user interface including a display 322 and a keyboard 332 having a plurality of input keys with which letters are associated. The processing subsystem serves as an operating system 408 for the incorporating device 300. The processing subsystem preferably includes a microprocessor 338 and a media storage device connected with other systems and subsystems of the device 300. The microprocessor 338 can be any integrated circuit or the like that is capable of performing computational or control tasks. The media storage device can exemplarily include a flash memory, a hard drive, a floppy disk, RAM 326, ROM, and other similar storage media.

As stated above, the operating system 408 software controls operation of the incorporating mobile communication device 300. The operating system 408 software is programmed to control operation of the handheld electronic device 300 and the operating system 408 software is configured to process an ambiguous request for display of menu options of user-selectable actions 1000 relevant to a currently running application 358 on the device 300 based upon detection of a user menu request. Based on the detection of the user menu request, the microprocessor 338 displays an abbreviated menu 624 having a short list 624 of menu options which is a subset of a full menu 618 of options of user-selectable actions 1000 of the short list 624 of menu options. The short list 624 of menu options have been assessed a higher probability for being user-selected than at least some of the user-selectable actions 1000 of the full menu 618 of options that are not included in the short list 624 of menu options.

In other embodiments, the processing subsystem also includes the various features described above in relation to the handheld device 300 embodiments. These various features include dimensional options, communication options, auxiliary input options and short menu sizing as described above in relation to the handheld electronic device 300 embodiment. Additionally, the options available from the short menu 624 are the same as those described above in relation to the method and handheld device 300 embodiments.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be affected using the thumb of the same hand in which the device 300 is held, however it is appreciated that additional control can be effected by using both hands. As a handheld device 300 that is easy to grasp and desirably pocketable, the size of the device 300 must be kept relatively small. Of the device's dimensions, limiting its width is important for the purpose of assuring cradleability in a user's hand. Moreover, it is preferred that the width of the device 300 be maintained at less than ten centimeters (approximately four inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously configured so that its height is greater than its width, but still remain easily supported and operated in one hand.

A potential problem is presented by the small size of the device 300 in that there is limited exterior surface area for the inclusion of user input and device output features. This is especially true for the "prime real estate" on the front face of the device 300, where it is most advantageous to include a display screen 322 that outputs information to the user. The display screen 322 is preferably located above a keyboard that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 332 during data entry periods.

To facilitate textual data entry into the device 300, an alphabetic keyboard is provided. In one version, a full alphabetic keyboard 332 is utilized in which there is one key per letter. In this regard, the associated letters can be advantageously organized in QWERTY, QWERTZ, AZERTY or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

An alternative configuration is to provide a reduced keyboard in which at least some of the keys have more than one letter associated therewith (see FIG. 1 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids.

Preferably, the character discrimination is accomplished utilizing disambiguation software included on the device 300. To accommodate software use on the device 300, a memory 324 and microprocessor 338 are provided within the body of the handheld unit for receiving, storing, processing, and outputting data during use. Therefore, the problem of needing a textual data input means is solved by the provision of either a full or reduced alphabetic keyboard 332 on the presently disclosed handheld electronic device 300. It should be further appreciated that the keyboard 332 can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device 300 preferably includes an auxiliary input that acts as a cursor navigational tool and which is also exteriorly located upon the front face of the device 300. Its front face location is particularly advantageous because it makes the tool easily thumb-actuable like the keys of the keyboard. In a particularly useful embodiment, the navigational tool is a trackball 321 which is easily utilized to instruct two-dimensional screen cursor movement in substantially any direction, as well as act as an actuator when the ball of the trackball 321 is depressed like a button. The placement of the trackball 321 is preferably above the keyboard 332 and below the display screen 322; here, it avoids interference during keyboarding and does not block the user's view of the display screen 322 during use (See FIG. 1).

In some configurations, the handheld electronic device 300 may be standalone in that it does not connect to the "outside world." As discussed before, one example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device 300 is significantly enhanced when connectable within a communication system, and particularly when connectable on a wireless basis in a network 319 in which voice, text messaging, and other data transfer are accommodated.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in a row of keys including a auxiliary input device 328. Additionally, the row of keys, including the navigation tool, preferably has a menu key 606 and a back key or escape key 608. The menu key 606 is used to bring up a menu and the escape key 608 is used to return to the previous screen or previous menu selection.

The handheld electronic device 300 includes an input portion 604 and an output display portion. The output display portion can be a display screen 322, such as an LCD or other similar display device.

The keyboard 332 includes a plurality of keys that can be of a physical nature such as actuable buttons or they can be of a software nature, typically constituted by virtual representations of physical keys on a display screen 322 (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia, representing character(s), command(s), and/or functions(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figure 9A:
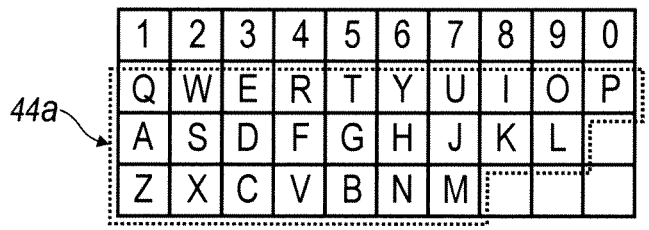
FIG. 9a illustrates an exemplary QWERTY keyboard layout.
Figure 9B:
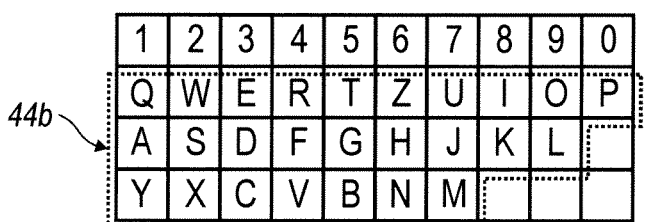
FIG. 9b illustrates an exemplary QWERTZ keyboard layout.
Figure 9C:
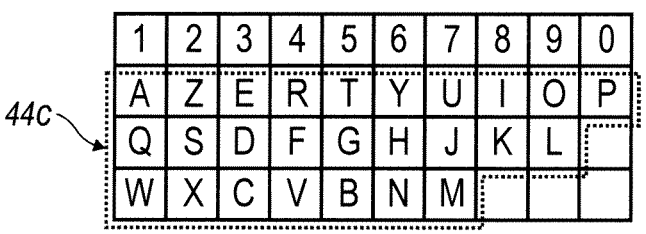
FIG. 9c illustrates an exemplary AZERTY keyboard layout.
Figure 9D:
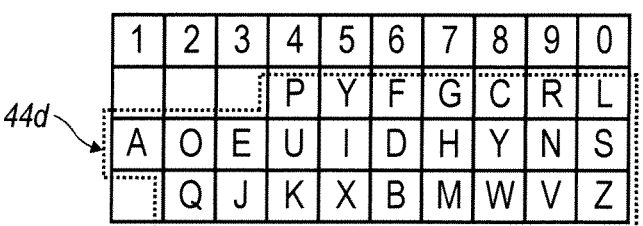
FIG. 9d illustrates an exemplary Dvorak keyboard layout.

The various characters, commands and functions associated with keyboard typing in general are traditionally arranged using various conventions. The most common of these in the United States, for instance, is the QWERTY keyboard layout. Others include the QWERTZ, AZERTY, and Dvorak keyboard configurations. The QWERTY keyboard layout is the standard English-language alphabetic key arrangement 44a shown in FIG. 9a. The QWERTZ keyboard layout is normally used in German-speaking regions; this alphabetic key arrangement 44b is shown in FIG. 9b. The AZERTY keyboard layout 44c is normally used in French-speaking regions and is shown in FIG. 9c. The Dvorak keyboard layout was designed to allow typists to type faster; this alphabetic key arrangement 44d is shown in FIG. 9d.

Alphabetic key arrangements are often presented along with numeric key arrangements. Typically, the numbers 1-9 and 0 are positioned in the row above the alphabetic keys 44a-d, as shown in FIG. 9a-d. Alternatively, the numbers share keys with the alphabetic characters, such as the top row of the QWERTY keyboard. Yet another exemplary numeric key arrangement is shown in FIG. 10, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 11.

As shown in FIG. 11, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

FIGS. 11 and 12 both feature numeric keys arranged according to the ITU Standard E. 161 form. In addition, FIG. 12 also incorporates alphabetic characters according to the ITU Standard E. 161 layout as well.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor 338 of these types of handheld electronic devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIGS. 7 and 13 show a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. As exemplified in FIG. 13, a color scheme of the numeric phone keys has a two tone appearance, with the upper portion of the numeric keys being a first color and the lower portion of the numeric keys being a second color. The first color may be lighter than the second color, or darker than the second color. Furthermore, two exterior key columns 160, 170 are shown on these figures according to the disclosure provided herein.

Another embodiment of a reduced alphabetic keyboard is found on a standard phone keypad 42. Most handheld electronic devices 300 having a phone key pad 42 also typically include alphabetic key arrangements overlaying or coinciding with the numeric keys as shown in FIG. 12. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIGS. 11 (no alphabetic letters) and 12 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

While several keyboard layouts have been described above, alternative layouts integrating the navigation tool into the keyboard are presented below. The key arrangements and mobile devices described herein are examples of a conveniently sized multidirectional navigational input key that is integrated with an alphanumeric key layout. The example multidirectional navigational input keys can be used in a navigation mode to move, for example, a cursor or a scroll bar. In an alphabetic or numeric mode, it can be used to enter numbers or letters. This dual feature allows for fewer and larger keys to be disposed on the keyboard while providing for a QWERTY, reduced QWERTY, QWERTZ, Dvorak, or AZERTY key layout and navigational input. These familiar keyboard layouts allow users to type more intuitively and quickly than, for example, on the standard alphabetic layout on a telephone pad. By utilizing fewer keys, the keys can be made larger and therefore more convenient to the user.

In some examples, keys in the middle columns are larger than keys in the outer columns to prevent finger overlap on the interior keys. As used herein, middle columns are all columns that are not on the outside left and right sides. The term "middle column" is not limited to the center column. It is easier for a user to press keys on the outer columns without their finger overlapping an adjacent key. This is because part of the user's thumb or finger can overlap the outside housing of the device, rather than other keys. Therefore, these outer column keys can be made smaller. The multidirectional navigational input device is provided in the center of the keypad and has a larger surface than the outside keys. The larger surface in the inner part of the keyboard helps prevent finger overlap.

Exemplary embodiments have been described hereinabove regarding both handheld electronic devices 300, as well as the communication networks 319 within which they cooperate. Again, it should be appreciated that the focus of the present disclosure is enhanced usability of today's more sophisticated wireless handheld communication devices 300 taking into account the necessary busyness of the front face real estate of these more compact devices that incorporate additional user interfaces.

What is claimed is:
1. A communication device comprising:
a body having a front face;
a key field located on the front face of the body, the key field comprising:
  a lateral exterior key column having a call initiate key, a toggle key for changing between a predictive text mode and a tap-typing mode, a CAP lock key, and a number lock key;
  a plurality of alphanumeric input keys, the alphanumeric input keys comprising a plurality of alphabetic keys having letters associated therewith and a numeric telephone keypad at least partially overlaid on the plurality of alphabetic keys, and
  a menu key that is different from the plurality of alphanumeric input keys, the menu key being actuable to generate menu commands;
a navigation tool located on the front face of the body, the navigation tool being actuable to generate navigation tool commands; and a microprocessor that receives the menu commands and the navigation tool commands, the microprocessor being programmed to generate a first menu in response to receiving the navigation tool commands and a second menu in response to receiving the menu commands, the second menu being different than the first menu, and the first menu containing a list of menu items abbreviated from the second menu.

2. The communication device as recited in claim 1, wherein the key field includes a plurality of key columns, the plurality of key columns including lateral exterior key columns having one or more function keys in each of the lateral exterior key columns.

3. The communication device as recited in claim 2, wherein the function keys constituting the lateral exterior columns exclusively have application functions associated therewith.

4. The communication device as recited in claim 2, wherein the lateral exterior key columns include a right-hand side lateral exterior key column having a return-carriage key.

5. The communication device as recited in claim 2, wherein the lateral exterior key columns include a right-hand side lateral exterior key column having a character delete key.

6. The communication device as recited in claim 2, wherein the lateral exterior key columns include a right-hand side lateral exterior key column having a call cancel key.

7. The communication device as recited in claim 6, wherein at least one key in the right-hand side lateral exterior key column is a return-carriage key and at least one key in the right-hand side lateral exterior key column is a character delete key.

8. The communication device as recited in claim 7, wherein the call cancel key is located above the character delete key which is located above the return-carriage key.

9. The communication device as recited in claim 8, wherein at least one key in the right-hand side lateral exterior key column is a speaker phone toggle key located above the return-carriage key.

10. The communication device as recited in claim 2, wherein the lateral exterior key columns include a left-hand side lateral exterior key column having a toggle key for changing between a predictive text mode and a tap-typing mode.

11. The communication device as recited in claim 2, wherein the lateral exterior key columns include a left-hand side lateral exterior key column having a symbol list call-up key.

12. The communication device as recited in claim 2, wherein the lateral exterior key columns include a left-hand side lateral exterior key column having the call initiate key.

13. The communication device as recited in claim 2, wherein the lateral exterior key columns include a left-hand side lateral exterior key column having the CAP lock key.

14. The communication device as recited in claim 2, wherein the lateral exterior key columns include a left-hand side lateral exterior key column having the number lock key.

15. The communication device as recited in claim 2, wherein the lateral exterior key columns include a left-hand side lateral exterior key column having the call initiate key located above the toggle key, the toggle key being located above the symbol list call-up key which is located above the CAP lock key which is located above the number lock key.

16. The communication device as recited in claim 1, wherein the navigation tool is at least partially surrounded by the key field.

17. The communication device as recited in claim 1, wherein the microprocessor is programmed to display the first menu as a short list of menu items and to display the second menu as an extended list of menu items.

18. The communication device as recited in claim 1, wherein the lateral exterior key column is at a side and has the call initiate key located above the toggle key, the toggle key being located above the symbol list call-up key which is located above the CAP lock key which is located above the number lock key.

19. The communication device as recited in claim 18, further comprising a right-hand side lateral exterior key column having a call cancel key.

20. The communication device as recited in claim 1, wherein the call initiate key is located above the toggle key.

21. The communication device as recited in claim 1, wherein the toggle key is located above the symbol list call-up key.

22. The communication device as recited in claim 1, wherein the symbol list call-up key is located above the CAP lock key.

23. A communication device comprising:
   a body having a front face;
   a user interface located on the front face of the body;
   a key field located on the front face of the body, the key field comprising:
      a lateral exterior key column having a call initiate key, a toggle key for changing between a predictive text mode and a tap-typing mode, a CAP lock key, and a number lock key;
      a plurality of alphanumeric input keys, the alphanumeric input keys comprising a plurality of alphabetic keys having letters associated therewith and a numeric telephone keypad at least partially overlaid on the plurality of alphabetic keys, and
      a menu key that is different from the plurality of alphanumeric input keys, the menu key being actuable to generate menu commands; and
   a microprocessor that receives the menu commands and determines a location of a cursor on the user interface, the microprocessor being programmed to generate a first menu in response to receiving the menu commands while the cursor is positioned in a first defined area and a second menu in response to receiving the menu commands while the cursor is positioned in a second defined area, the second menu being different than the first menu, and wherein the first menu contains a list of menu items abbreviated from the second menu.

24. The communication device as recited in claim 23, wherein the first defined area includes a location on the user interface that is configured for data entry and wherein the second defined area includes a location on the user interface that is configured for menu display actuation.

25. The communication device as recited in claim 24, wherein the microprocessor is programmed to display a short list of menu items while the cursor is positioned in the first defined area and to display an extended list of menu items while the cursor is positioned in the second defined area.

26. The communication device as recited in claim 23, wherein the lateral exterior key column is at a side and has the call initiate key located above the toggle key, the toggle key being located above the symbol list call-up key which is located above the CAP lock key which is located above the number lock key.

27. A communication device comprising:
   a body having a front face;
   a key field located on the front face of the body, the key field comprising:
      a lateral exterior key column having a call initiate key, a toggle key for changing between a predictive text mode and a tap-typing mode, a CAP lock key, and a number lock key;
      a plurality of alphanumeric input keys that allows entry of letters or, in a numerical mode, allows entry of numbers, and
      a menu key that is different from the plurality of alphanumeric input keys, the menu key being actuable to generate menu commands;
   a navigation tool located on the front face of the body, the navigation tool being actuable to generate navigation tool commands; and
   a microprocessor that receives the menu commands and the navigation tool commands, the microprocessor being programmed to generate a first menu in response to receiving the navigation tool commands and a second menu in response to receiving the menu commands, the second menu being different than the first menu, and the first menu containing a list of menu items abbreviated from the second menu.

* * * * *